(12) United States Patent
Grétarsson et al.

(10) Patent No.: US 12,712,586 B2
(45) Date of Patent: Aug. 18, 2026

(54) SMART RING

(71) Applicant: Genki Instruments ehf., Reykjavik (IS)

(72) Inventors: Daniel Grétarsson, Reykjavik (IS); Jón Helgi Hólmgeirsson, Reykjavik (IS); Ólafur Bjarki Bogason, Reykjavik (IS)

(73) Assignee: Genki Instruments ehf., Reykjavik (IS)

( * ) Notice: Subject to any disclaimer, the term of this patent is extended or adjusted under 35 U.S.C. 154(b) by 790 days.

(21) Appl. No.: 17/896,160

(22) Filed: Aug. 26, 2022

(65) Prior Publication Data

US 2022/0407550 A1 Dec. 22, 2022

Related U.S. Application Data

(63) Continuation-in-part of application No. 17/875,460, filed on Jul. 28, 2022, now abandoned, which is a continuation of application No. 17/022,142, filed on Sep. 16, 2020, now Pat. No. 11,502,713.

(51) Int. Cl.
*G06F 3/04883* (2022.01)
*H04B 1/3827* (2015.01)

(52) U.S. Cl.
CPC ......... *H04B 1/385* (2013.01); *G06F 3/04883* (2013.01); *H04B 2001/3861* (2013.01)

(58) Field of Classification Search
CPC ............ H04B 1/385; H04B 2001/3861; G06F 3/04883
See application file for complete search history.

(56) References Cited

U.S. PATENT DOCUMENTS 9,042,971 B2 5/2015 Brumback et al.
9,495,575 B2 11/2016 Kim et al.
9,575,562 B2 * 2/2017 Cheng .................... G06F 3/017
9,582,076 B2 2/2017 Kienzle et al.
9,594,427 B2 3/2017 Priyantha et al.
9,880,620 B2 1/2018 Kienzle et al.
10,043,125 B2 8/2018 Park
10,055,563 B2 8/2018 Huang et al.
10,110,272 B2 10/2018 Barnett, Jr.
10,186,014 B2 1/2019 Cho et al.
10,478,099 B2 11/2019 Lor et al.
10,838,499 B2 11/2020 Wang et al.
(Continued)

FOREIGN PATENT DOCUMENTS

DE 11201900117 * 12/2020 ......... G06F 3/04883
KR 200476139 Y1 2/2015
(Continued)

*Primary Examiner* — Davetta W Goins
(74) *Attorney, Agent, or Firm* — Gearhart Law LLC

(57) ABSTRACT

A wearable device is described. The wearable device includes a body portion and an adjustable strap affixed to a body portion to form an opening. The opening receives a body part of a user therein. The wearable device includes a control component, a gesture component, and/or a sensing component configured to detect input, gestures, and/or biometric parameters of the user and transmit the input, the gestures, and/or the biometric parameters to a smart device connected to the wearable device via a wireless personal area network technology to modify parameters of the smart device. The wearable device may include one or more sensors that assist the control component, the gesture component, and/or the sensing component.

15 Claims, 37 Drawing Sheets

(56) References Cited

U.S. PATENT DOCUMENTS 11,240,220 B2 2/2022 Boutnaru
11,422,623 B2 8/2022 Ma
2007/0147025 A1* 6/2007 Shirey ................. F21V 21/0885 362/109
2011/0210931 A1 9/2011 Shai
2012/0220233 A1 8/2012 Teague et al.
2015/0049591 A1 2/2015 Adams et al.
2015/0287412 A1 10/2015 Tang
2016/0077587 A1* 3/2016 Kienzle ................... G06F 3/033 345/156
2016/0350581 A1 12/2016 Manuel et al.
2021/0089131 A1 3/2021 Wang et al.

FOREIGN PATENT DOCUMENTS

KR 20160062738 A 6/2016
WO 2016039553 A1 3/2016
WO 2016044035 A1 3/2016

* cited by examiner

190

104

SMART RING

CROSS-REFERENCE TO RELATED APPLICATIONS SECTION

This Application is a U.S. Non-Provisional Patent Application that is a Continuation in Parts of the application U.S. Non-Provisional patent application Ser. No. 17/875,460 filed on Jul. 28, 2022 which is a Continuation application of U.S. Non-Provisional patent application Ser. No. 17/022,142 filed on Sep. 16, 2020, the entire contents of which are hereby incorporated by reference in their entirety.

FIELD OF THE EMBODIMENTS

The field of the invention and its embodiments relate to wearable devices. In particular, the present invention and its embodiments relate to wearable smart rings providing numerous functions.

BACKGROUND OF THE EMBODIMENTS

Wearable technologies or devices are becoming increasingly popular as fashion accessories that also provide electronic function(s). For example, depending on its features, a wearable technology or device can serve as a remote extension of a user's smartphone or other computing device, alerting a user of incoming calls, texts, emails, and/or updates from social media sites. The wearable technology or device can additionally act as a remote control of various functions of the other computing device in response to receiving a user input, such as triggering a camera, decreasing a volume of a song, locking a door, etc. In further examples, the wearable technology or device can also detect and measure various biometric parameters of the user wearing the device. However, what is needed is a wearable technology or device that combines gesture detection, biometric parameter detection, and user input detection to modify parameters or features of the other computing device.

REVIEW OF RELATED TECHNOLOGY

U.S. Published Patent Application No. 2019/0004604 A1 describes a finger-mounted device that may include finger-mounted units. The finger-mounted units may each have a body that serves as a support structure for components such as force sensors, accelerometers, and other sensors and for haptic output devices. The body may have sidewall portions coupled by a portion that rests adjacent to a user's fingernail. The body may be formed from deformable material such as metal or may be formed from adjustable structures such as sliding body portions that are coupled to each other using magnetic attraction, springs, or other structures. The body of each finger-mounted unit may have a U-shaped cross-sectional profile that leaves the finger pad of each finger exposed when the body is coupled to a fingertip of a user's finger. Control circuitry may gather finger press input, lateral finger movement input, and finger tap input using the sensors and may provide haptic output using the haptic output device.

U.S. Published Patent Application No. 2011/0210931 A1 describes finger-worn devices. The finger-worn devices may be connected and disconnected from other devices. In some embodiments, the finger-worn devices may be operated to generate sound and visual output.

U.S. Published Patent Application No. 2016/0203362 A1 describes a wearable device that may sense a movement by a user wearing the wearable device. The term "wearable device" may refer to a smartphone, a smartwatch, a smart bracelet, a smart wristband, a smart ankle band, a smart ring, or a smart necklace. The wearable device may also determine whether a path of the movement corresponds to one or more predefined patterns. The wearable device may further perform one or more operations in response to a determination that the path of the movement corresponds to at least one of the one or more predefined patterns.

U.S. Published Patent Application No. 2016/0350581 A1 describes a smart ring having a body, a biometric sensor, a memory, and a controller. The biometric sensor is positioned in the ring body and is configured to sense a biometric feature. The memory is configured to store a biometric feature of an authorized user. The controller is configured to determine whether the biometric feature sensed by the biometric sensor matches the biometric feature stored in the memory. In response to determining that the biometric feature sensed by the biometric sensor matches the biometric feature stored in the memory, the controller is configured to enable a function of the ring. The function may include: controlling music playback, controlling a volume of music playback, triggering a camera, unlocking a door, etc.

U.S. Published Patent Application No. 2017/0024008 A1 describes a smart ring configured to be worn on a first segment of a finger of a user. The smart ring can include at least one flexion sensor secured to the smart ring in a manner that can detect a distance between the at least one flexion sensor and a second segment of the finger. The smart ring can also include an input component configured to analyze signals from the at least one flexion sensor to detect a pose of the finger.

KR 200476139 Y1 describes a smart ring having a tetragonal smart chip embedded therein. The smart ring includes: a body having a ring shape into which a finger can be inserted, a smart chip detachably coupled to one part of the outer circumferential surface of the body, and a coupling member provided on the outer circumferential surface of the body such that the smart chip is coupled to the body.

U.S. Published Patent Application No. 2015/0287412 A1 describes a 3C smart ring capable of coupling 3C products in a cable or wireless communication manner. The 3C smart ring includes a ring body, a power supply unit, a power switch, a control unit, a transmitting/receiving unit, and a microphone. The power supply unit and the transmitting/receiving unit are both coupled electrically with the control unit. The power supply unit provides electricity for operating the 3C smart ring. Through the transmitting/receiving unit, the 3C smart ring can couple via wireless signals to 3C networking devices. Further, the power switch and the microphone are located at a lateral side of the ring body, in which the power switch for controlling on/off of the whole ring is coupled electrically with the control unit. The microphone coupled electrically with the control unit is to forward voice signals to the networking 3C devices via the control unit and the transmitting/receiving unit.

U.S. Published Patent Application No. 2015/0338916 A1 describes a smart ring that includes a finger band configured to accommodate a user's finger and a set of pressure sensors positioned on an inner surface of the finger band and configured to sense changes to tendons of the user's finger as pressure differentials and to output associated signals. The smart ring also includes a gesture component configured to interpret the signals from the set of pressure sensors to identify individual actions performed by the user's finger.

U.S. Published Patent Application No. 2016/0034742 A1 describes a ring-type terminal. The terminal includes a main body configured to be placed on and surround a user's finger and an insertion region in which the finger is inserted. The terminal also includes a fingerprint sensor provided on at least one region of an inner circumferential surface of the main body that is configured to recognize a fingerprint of the finger. The terminal further includes a guide module provided on the inner circumferential surface such that the finger comes in contact with the fingerprint sensing module while the finger is inserted in the insertion region. The terminal also includes a controller configured to execute a function based on the fingerprint sensed by the fingerprint sensing module. The function may include: capturing still images, capturing moving images, playing music files, playing video files, playing games, receiving broadcasts, etc.

WO 2016/044035 A1 and U.S. Published Patent Application No. 2016/0077587 A1 describe a smart ring that is configured to be worn on a first segment of a finger of a user. The example smart ring can include at least one flexion sensor secured to the smart ring in a manner that can detect a distance between the at least one flexion sensor and a second segment of the finger. The example smart ring can also include an input component configured to analyze signals from the at least one flexion sensor to detect a pose of the finger.

WO 2016/039553 A1 describes a smart ring. The smart ring includes a body having a ring shape into which a finger can be inserted. The smart ring also includes a tetragonal smart chip detachably coupled to one part of the outer circumferential surface of the body. The smart ring further includes a coupling member provided on the outer circumferential surface of the body such that the smart chip is coupled to the body.

U.S. Published Patent Application No. 2016/0292563 A1 describes methods for pairing at least one smart ring with a primary device.

Various devices exist in the art. However, these devices are substantially different from the present disclosure, as the other inventions fail to solve all the problems taught by the present disclosure.

SUMMARY OF THE EMBODIMENTS

The present invention and its embodiments relate to wearable devices. In particular, the present invention and its embodiments relate to wearable smart rings providing numerous functions.

A first embodiment of the present invention describes a wearable device. The wearable device includes a watch, a bracelet, a wristband, an ankle band, a ring, or a necklace. The wearable device includes a strap affixed to a body portion of the wearable device to form an opening. In some examples, the strap is adjustable. The opening receives a body part of a user. In examples where the wearable device is the ring, the body part of the user is a finger of the user. More specifically, in examples where the wearable device is the ring, the body part of the user is an index finger of the user.

The body portion of the wearable device includes a cover and a receiver portion located on the cover. The receiver portion is configured to receive an input from the user to modify a parameter of a smart device connected to the wearable device via a wireless personal area network technology (such as Bluetooth Low Energy). The parameter is an on position, an off position, a pause position, a play position, a channel, a volume, a color, a song, a movie, a brightness, a locked status, an unlocked status, a temperature, presented content, a phone call, a message, a notification, two-dimensional content, and/or three-dimensional content. The smart device is a smart light, a smart television, a smartphone, a smart thermostat, a smart doorbell, a smart lock, a smart refrigerator, smart glasses, a smart watch, or a smart speaker.

The body portion of the wearable device further comprises a light-emitting diode (LED) display. In additional examples, the wearable device includes a rechargeable battery and a charging port for charging the wearable device. Additionally, the wearable device includes a control component. The control component is configured to: receive, from the receiver portion, the input from the user and transmit the input via the wireless personal area network technology to the smart device to modify the parameter of the smart device.

The control component is further configured to: identify the input from the user as a gesture input. The gesture input is bound to the modification of the parameter of the smart device by means of an algorithmic classifier. The algorithmic classifier comprises a machine learning classifier. Additionally, in response to receiving, from the receiver portion, the input from the user or in response to recognizing the gesture input by the algorithmic classifier, the control component is further configured to provide a haptic response to the input or the gesture input.

A second embodiment of the present invention describes a wearable device. The wearable device is a ring. The wearable device includes an adjustable strap affixed to a body portion to form an opening. The opening receives a body part of a user. In examples where the wearable device is the ring, the body part of the user is the index finger of the user. Moreover, the body portion of the wearable device includes a cover, a rechargeable battery, a light-emitting diode (LED) display, and a charging port for charging the wearable device.

The wearable device also includes a gesture component. The gesture component is configured to: detect pressure imparted by the body part of the user during performance of an action (e.g., a touch action or a non-touch action) by the body part of the user, measure one or more biometric parameters of the user, and transmit the one or more biometric parameters via the wireless personal area network technology (e.g., Bluetooth Low Energy) to the smart device. Each of the one or more biometric parameters may include an oxygen saturation level, a body temperature, a quantity of calories burned, and/or a pulse.

In some examples, the wearable device includes at least one pressure sensor configured to assist the gesture component. In some examples, the at least one pressure sensor comprises an array of pressure sensors radially distributed around an inner surface of the body portion. In other examples, the at least one pressure sensor comprises a force sensitive resistor or a piezoelectric sensor. In further examples, the wearable device includes one or more motion detecting sensors configured to assist the gesture component. Each of the one or more motion detectors comprise audio sensors or accelerometers.

A third embodiment of the present invention describes a wearable device that is a ring. The wearable device includes an adjustable strap affixed to a body portion to form an opening. The opening receives the index finger of the user. The body portion of the wearable device includes a cover, a rechargeable battery, the LED display, a receiver portion, and a charging port. The receiver portion is located on the cover and is configured to receive the input from the user to modify a parameter of a smart device connected to the wearable device via the wireless personal area network technology (e.g., Bluetooth Low Energy). The charging port charges the wearable device.

The wearable device also includes a control component and a gesture component, among other components not explicitly listed herein. The control component is configured to: receive, from the receiver portion, the input from the user and transmit the input via the wireless personal area network technology to the smart device to modify the parameter of the smart device. The gesture component is configured to: detect pressure imparted by the index finger of the user during performance of an action by the index finger of the user, measure one or more biometric parameters of the user, and transmit the one or more biometric parameters via the wireless personal area network technology to the smart device.

In examples, the wearable device includes one or more motion detecting or detection sensors configured to assist the gesture component, where each of the one or more motion detecting or detection sensors comprise an audio sensor or an accelerometer. In other examples, the wearable device includes at least one pressure sensor configured to assist the gesture component, where each of the at least one pressure sensor comprises a force sensitive resistor or a piezoelectric sensor.

A fourth embodiment of the present invention describes a system. The system includes a surface component, a smart device comprising a universal interface, a cursor movable on the universal interface, and a wearable device (e.g., a watch, a bracelet, a wristband, an ankle band, a ring, and/or a necklace). The wearable device includes an adjustable strap affixed to a body portion to form an opening. The opening is configured to receive a body part of a user therein. The wearable device also includes a detector component and at least one sensor configured to detect a movement action by a finger of the user on the surface component and move, in real-time, the cursor on the universal interface based on the movement action.

In some examples, the at least one sensor comprises a magnetic, angular rate, and gravity (MARG) sensor. The detector is configured to determine if the finger of the user is touching the surface component. Moreover, the wearable device further comprises one or more supervised learning algorithms that are configured to track the movement action of the finger of the user on the surface component and map the movement action to cursor displacement on the universal interface.

A fifth embodiment of the present invention describes a system. The system includes: a smart device comprising a universal interface, a cursor movable on the universal interface, and a wearable device (e.g., a watch, a bracelet, a wristband, an ankle band, a ring, and/or a necklace). The wearable device includes an adjustable strap affixed to a body portion to form an opening. The opening is configured to receive a body part of a user therein. The wearable device includes a gesture component and at least one sensor configured to: detect an action by the user on the wearable device (e.g., a tap action) to activate the wearable device, detect a gesture action by the user (e.g., a rotation action, a left swipe action, a right swipe action, a movement upwards action, or a movement downwards action, etc.), and execute an action on the universal interface (e.g., an increase in a volume, a decrease in the volume, a skip action, a zoom in action, or a zoom out action, etc.).

In some examples, the wearable device is a ring and the gesture action comprises a movement of a hand of the user. The at least one sensor is further configured to: detect another action executed by the user on the wearable device to pause the action executed on the universal interface and/or detect another action executed by the user on the wearable device to engage or click on a component on the universal interface.

In other examples, the smart device further comprises a handwriting API. The gesture action by the user comprises drawn out points on a two-dimensional plane. The handwriting API is configured to: convert the points to a sequence of cubic Bezier curves, query the sequence of cubic Bezier curves, and identify a match between the sequence of cubic Bezier curves and a predicted match such that the predicted match is displayed as text on the universal interface.

The wearable device may also include one or more motion detecting sensors configured to assist the gesture component. Each of the one or more motion detecting sensors comprises an audio sensor or an accelerometer. In other examples, the wearable device further comprises: at least one pressure sensor configured to assist the gesture component. The at least one pressure sensor comprises an array of pressure sensors radially distributed around an interior surface of the body portion. Each of the at least one pressure sensor comprises a force sensitive resistor or a piezoelectric sensor. In further examples, the wearable device is the ring and the body part of the user is an index finger of the user.

In general, the present invention succeeds in conferring the following benefits and objectives.

It is an object of the present invention to provide a wearable device.

It is an object of the present invention to provide a smart ring.

It is an object of the present invention to provide a lightweight, intuitive, and non-intrusive smart ring.

It is an object of the present invention to provide a smart ring capable of gesture detection, biometric parameter detection, and user input detection to modify parameters or features of a computing device or smart device connected to the wearable device via the wireless personal area network technology.

DESCRIPTION OF THE PREFERRED EMBODIMENTS

Figure 1A:
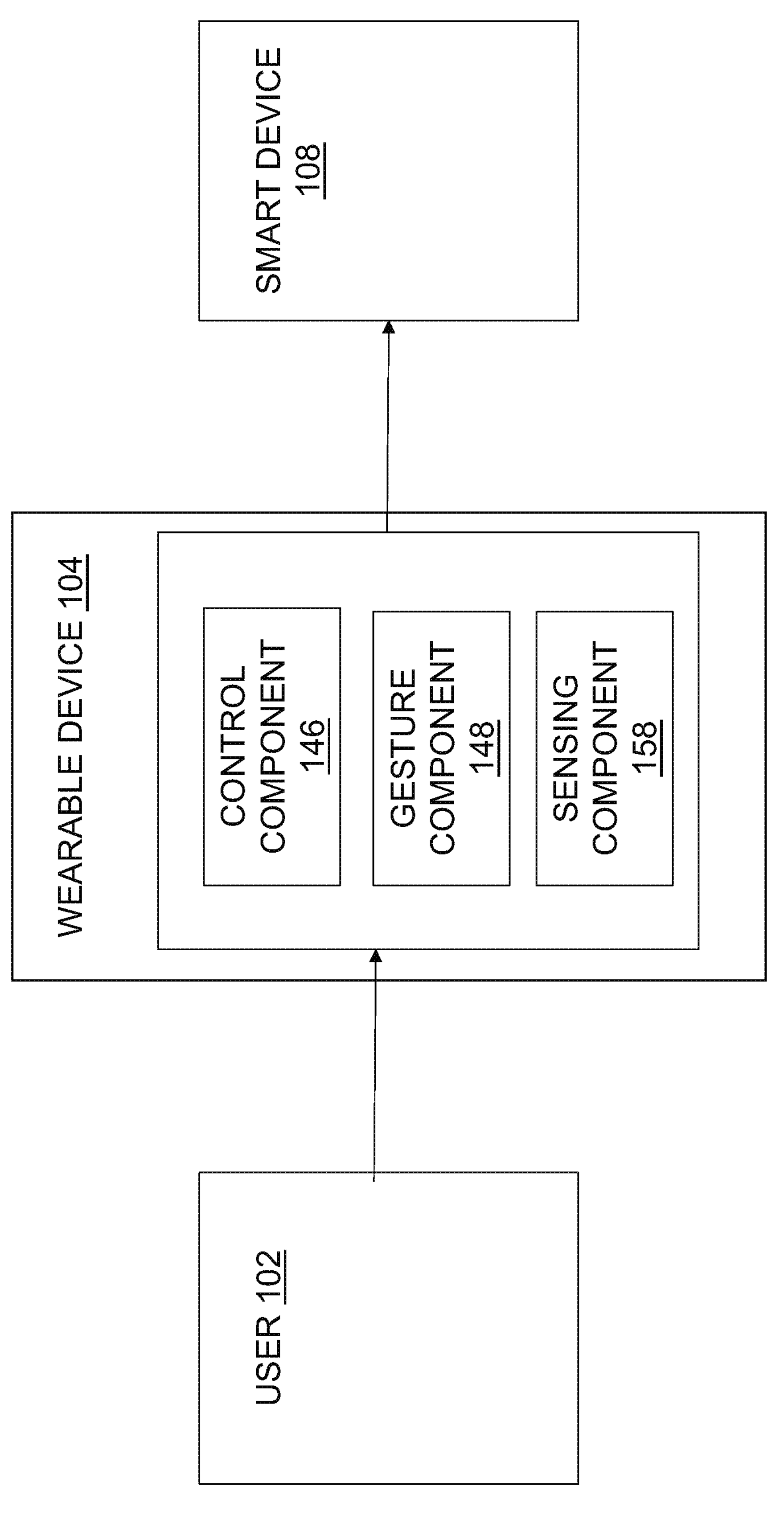
FIG. 1A depicts a block diagram of a system, according to at least some embodiments disclosed herein.

The preferred embodiments of the present invention will now be described with reference to the drawing. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawing that various modifications and variations can be made thereto.

As used herein, the singular forms "a," "an," and "the," are intended to include the plural forms as well, unless the context clearly indicates otherwise.

The phrase "and/or," as used herein in the specification and in the claims, should be understood to mean "either or both" of the elements so conjoined, i.e., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Figure 12:
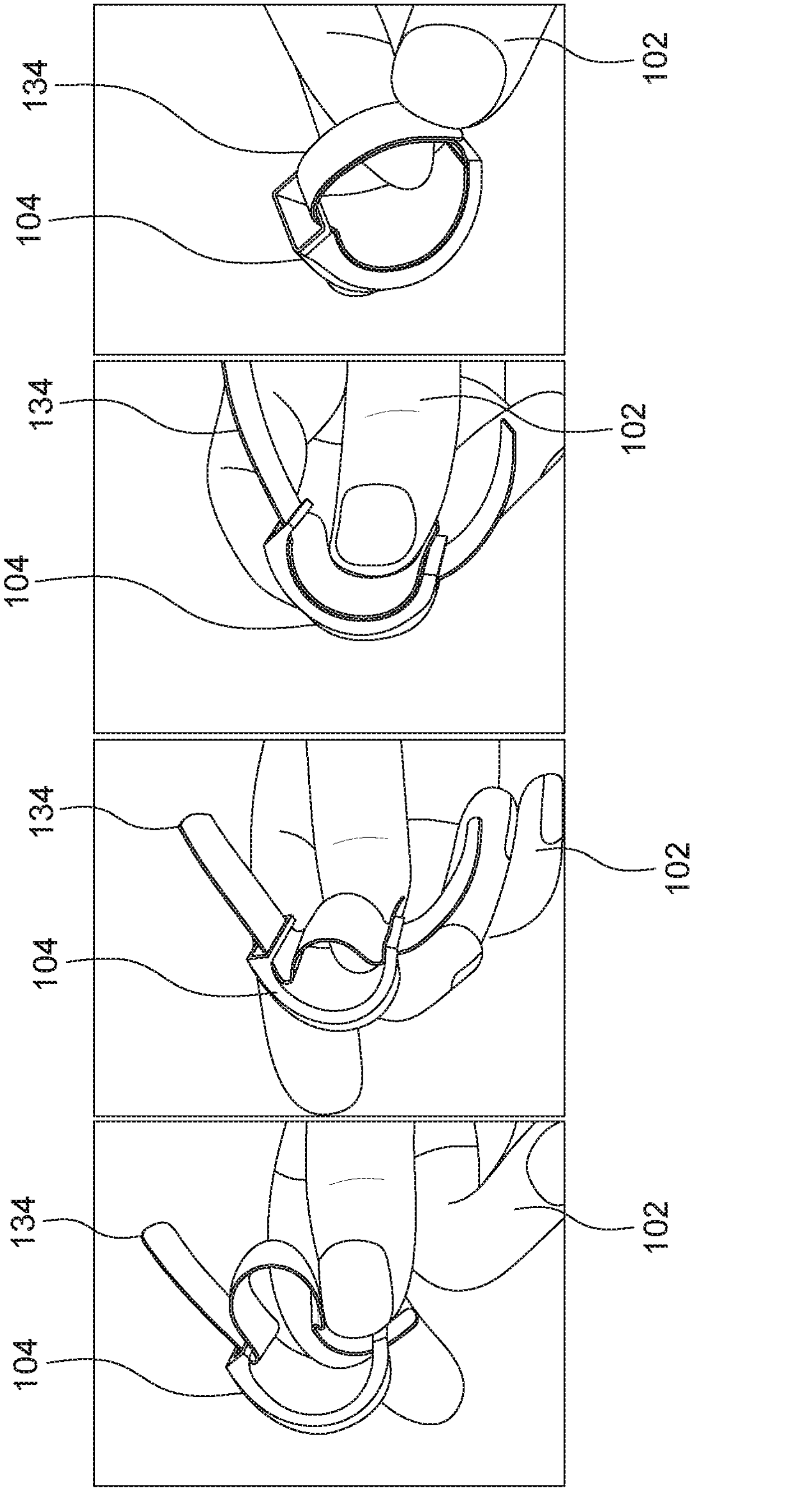
FIG. 12 depicts rear perspective views of affixing an adjustable strap to a portion of a wearable device, according to at least some embodiments disclosed herein.

A wearable device 104 and components of the wearable device 104 are depicted in at least FIG. 1A-FIG. 13 herein. Moreover, FIG. 5-FIG. 9 depict views to assemble at least a portion of the wearable device 104. It should be appreciated that the wearable device 104 may be configured to control various features of computing devices or smart devices connected to the wearable device 104 via a wireless personal area network technology 178 (such as Bluetooth low energy 4.2 standard) (of FIG. 13), where control is performed in response to detecting a gesture from a user 102 (of FIG. 1A and FIG. 12) while the user 102 is wearing the wearable device 104, detecting an input from the user 102 on a portion of the wearable device 104 while the user 102 is wearing the wearable device 104, and/or detecting biometric parameters of the user 102 while the user 102 is wearing the wearable device 104.

The wearable device 104 may be a watch, a bracelet, a wristband, an ankle band, a ring, or a necklace, among other examples not explicitly listed herein. In preferred embodiments, the wearable device 104 may be the ring. In some examples, the wearable device 104 may comprise a mirrored design such that the wearable device 104 may be worn on both the left hand and the right hand of the user 102.

The wearable device 104 includes a body portion. In some examples, the body portion of the wearable device 104 may comprise a cover. In some examples, the cover may comprise a polycarbonate (PC) material and/or a thermoplastic elastomer (TPE) material, among others not explicitly listed herein. The cover of the wearable device 104 may include both a front cover component 110 and a back cover component 116 (of FIG. 2, FIG. 4, FIG. 9, and FIG. 10). The front cover component 110 and the back cover component 116 may be configured to interact with or be affixed to one another to form the cover.

The wearable device 104 may also include a battery 114 (of FIG. 2, FIG. 5, FIG. 6, FIG. 7, and FIG. 13) and a charging port 124 (of FIG. 2, FIG. 4, and FIG. 11) for charging the wearable device 104. In an example, the battery 114 may be a rechargeable battery. In some examples, the battery 114 may be a lithium-ion battery. In additional examples, the battery 114 may be a lithium-ion rechargeable battery with 60 mAh nominal capacity. In additional examples, the charging port 124 is a Universal Serial Bus (USB) port. In other examples, the charging port 124 is a micro-USB port and may be affixed to a rear of an exterior portion of the wearable device 104. A standard USB charger may be affixed to the USB port or the micro-USB port (e.g., the charging port 124). It should be appreciated that in some examples, the battery 114 may be a non-rechargeable battery. In these examples, the charging port 124 is not included as a component of the wearable device 104. Such charging of the smart device 108 may be wired, wireless, or may include contact charging.

In some examples, the body portion of the wearable device 104 may also include a display (not shown). In a first example, the display may be a light-emitting diode (LED) display. In additional examples, the LED display is a 9×5 LED matrix display. The wearable device 104 may also include an adjustable strap 134 (of FIG. 2, FIG. 4, and FIG. 12) affixed to the body portion at at least two locations to form an opening 150 (of FIG. 4). More specifically, and as depicted in at least FIG. 2, FIG. 11, and FIG. 12, the adjustable strap 134 may be woven through or received by an opening 142 and an opening 140 located on the body portion of the wearable device to form the opening 150. In some examples, the adjustable strap 134 may comprise a fabric material. In other examples, the adjustable strap 134 may be affixed together via a fastening mechanism 136 (of FIG. 2 and FIG. 4), such as Velcro, a clasp, a snap, etc.

The opening 150 of the wearable device 104 may be configured to receive a body part of the user 102 therein. In a preferred embodiment, the wearable device 104 may include the ring and the body part of the user 102 may include a finger of the user 102. In additional examples, the finger of the user 102 may be an index finger of the user 102. The adjustability of the adjustable strap 134 allows the wearable device 104 to be worn by users having different finger sizes.

The wearable device 104 may also include a main engine board (e.g., a printed circuit board 180) (of FIG. 2, FIG. 5, FIG. 6, FIG. 7, FIG. 8, FIG. 9, and FIG. 13) and a battery support/protection component 122 (of FIG. 2, FIG. 5, FIG. 6, FIG. 7, and FIG. 13). The battery support/protection component 122 may be a single chip lithium-ion battery protection chip. A screw 120 (of FIG. 2 and FIG. 11) may be received by an opening 144 of the cover to affix numerous components of the wearable device 104. The screw 120 may comprise a stainless steel material, however, the material of the screw 120 is not limited to such. It should be appreciated that another means of fixation may replace the screw 120 to achieve the same result.

It should be appreciated that the wearable device 104 may include one or more components. In an example, the wearable device 104 includes a control component 146, a gesture component 148, and/or a sensing component 158, among other components not explicitly listed herein, as depicted in at FIG. 1A. One or more of the control component 136, the gesture component 148, and/or the sensing component 158 may comprise one or more sensors 160 of FIG. 1D affixed to the body portion of the wearable device 104 such that the one or more sensors 160 may assist the control component 136, the gesture component 148, and/or the sensing component 158 of the wearable device 104 in performing various actions. The one or more sensors 160 of FIG. 1D may include pressure sensors 162, motion detection or detecting sensors 164, motion tracking sensors 166, audio sensors 168, force sensitive resistors 170, piezoelectric sensors 172, accelerometers 174, gyroscopes 190, and/or biometric sensors 176, among others not explicitly listed herein.

As described herein, an "accelerometer" (e.g., the accelerometers 174) is a tool that measure proper acceleration. Proper acceleration is the acceleration, or the rate of change of velocity, of a body in its own instantaneous rest frame. Single-axis and multi-axis accelerometers can detect both the magnitude and the direction of the proper acceleration, as a vector quantity, and can be used to sense orientation due to the direction of weight changes, coordinate acceleration, vibration, shock, and falling in a resistive medium (a case in which the proper acceleration changes, increasing from zero).

Micromachined microelectromechanical systems (MEMS) accelerometers are increasingly present in portable electronic devices to detect changes in the positions of these devices. When coupled with microelectronic circuits, MEMS accelerometers/sensors can be used to measure physical parameters, such as acceleration. MEMS sensors measure frequencies down to 0 Hz (static or DC acceleration). Variable capacitive (VC) MEMS accelerometers are lower range, high sensitivity devices used for structural monitoring and constant acceleration measurements. Piezoresistive (PR) MEMS accelerometers are higher range, low sensitivity devices used in shock applications. For additional information on MEMS accelerometers, see, Matej Andrejašic, "MEMS Accelerometers," Seminar, University of Ljubljana, Faculty for Mathematics and Physics, Department of Physics, March 2008, Pages 1-17, the contents of which are hereby incorporated by reference in its entirety.

As defined herein, a "gyroscope" (e.g., the gyroscopes 190) is a device used for measuring or maintaining orientation and angular velocity. In particular, the gyroscope is a device that measures the angular velocity of a body about a specified axis of rotation. FIG. 1E depicts a schematic diagram of a traditional MEMS vibratory gyroscope designed to measure the angular velocity of the body about the Z-axis of the ground reference frame. The main principle of MEMS gyroscopes is the transfer of energy between two modes of vibration, the drive and the sense modes, through the Coriolis acceleration. Coriolis acceleration is the acceleration due to the rotation of the Earth, experienced by particles moving along the Earth's surface.

For comparison purposes, the accelerometer (e.g., the accelerometers 174) is used to detect the orientation of the wearable device 104, whereas the gyroscope (e.g., the gyroscopes 190) adds an additional dimension to the information supplied by the accelerometer (e.g., the accelerometers 174) by tracking rotation or twist. More specifically, the accelerometer (e.g., the accelerometers 174) measures linear acceleration of movement and the directional movement of the wearable device 104. The accelerometer (e.g., the accelerometers 174) is not able to resolve its lateral orientation or tilt during that movement accurately unless the gyroscope (e.g., the gyroscopes 190) is present to add that information. The gyroscope (e.g., the gyroscopes 190) measures the angular rotational velocity. As such, both sensors measure rate of change.

It should be appreciated that the one or more sensors 160 may be placed on any suitable location on the wearable device 104. In a first example, the one or more of the sensors 160 may be located on or affixed to the body portion of the wearable device 104. In a second example, the one or more sensors 160 are contoured along an inside surface of the body portion of the wearable device 104. In a third example, the one or more sensors 160 may be contoured along an outside surface of the body portion of the wearable device 104. In a fourth example, a subset of the one or more sensors 160 are contoured along the inside surface of the body portion of the wearable device 104 and another subset of the one or more sensors 160 are contoured along the outside surface of the body portion of the wearable device 104. In a fifth example, the one or more sensors 160 may comprise an array of sensors radially distributed around the inner surface or the outer surface of the body portion of the wearable device 104.

In some examples where the wearable device 104 includes the control component 136, the wearable device 104 may include a receiver portion 126 (of FIG. 2, FIG. 3, FIG. 4, FIG. 9, and FIG. 10). As depicted, a shape of the receiver portion 126 is a hexagonal shape. However, the shape of the receiver portion 126 is not limited to such and may alternatively include a circular shape, a crescent shape, a triangular shape, a square shape, a parallelogram shape, a pentagonal shape, an octagonal shape, a rhombus shape, a heptagonal shape, an elliptical shape, or a star shape, among others not explicitly listed herein.

The receiver portion 126 may be located on the cover of the wearable device 104. In some examples, the receiver portion 126 may include a first component 128, a second component 130, and a third component 132 (of FIG. 2 and FIG. 3). Each of the first component 128, the second component 130, and the third component 132 may be buttons or locations on the receiver portion 126 that receive input from the user 102. In additional examples, the first component 128 may be an "up" component and the third component 132 may be a "down" component. The second component 130 may be located between the first component 128 and the third component 132. The second component 130 may be an "advance" or a "rewind" component.

The first component 128, the second component 130, or the third component 132 of the receiver portion 126 may receive the input from the user 102 (such as a push or a press input) to modify a parameter of a smart device 108. As described, the wearable device 104 may be configured to control various features of computing devices or smart devices connected to the wearable device 104 via the wireless personal area network technology 178 (such as Bluetooth low energy 4.2 standard). The smart device 108 may include a smart light, a smart television, a smartphone, a smart thermostat, a smart doorbell, a smart lock, a smart refrigerator, smart glasses, a smart watch, or a smart speaker, among other examples not explicitly listed herein. The parameter may include an on position, an off position, a pause position, a play position, a channel, a volume, a color (e.g., of a light), a song, a movie, a brightness (e.g., of the light), a locked status, an unlocked status, a temperature, presented content, a phone call, a message, a notification, two-dimensional content, and/or three-dimensional content, among other examples not explicitly listed herein.

More specifically, the control component 136 of the wearable device 104 may be configured to receive, from the receiver portion 126, the input from the user 102. In response, the control component 146 may be configured to transmit the input via the wireless personal area network technology 182 to the smart device 108 to modify the parameter of the smart device 108.

In a first illustrative example, the user 102 may wear the wearable device 104 on a left index finger of the user 102 and may execute the action, on the first component 128 of the receiver portion 126 of the wearable device 104, via a left thumb of the user 102 to increase the parameter (e.g., the temperature) of the smart device 108 (e.g., the smart thermostat). In a second illustrative example, the user 102 may wear the wearable device 104 on a right index finger of the user 102 and may execute the action via a right thumb of the user 102 on the third component 132 of the receiver portion 126 of the wearable device 104 to decrease the parameter (e.g., the temperature) of the smart device 108 (e.g., the smart thermostat). In a third example, the user 102 may wear the wearable device 104 on the left index finger of the user 102 and may execute the action via the left thumb of the user 102 on the second component 130 of the receiver portion 126 of the wearable device 104 to advance a slide of a presentation in an application on the smart device 108 (e.g., the smartphone).

In further illustrative examples, the user 102 may execute the action on the receiver portion 126 to turn on or turn off the smart light, increase or decrease a brightness of the smart light, increase or decrease a volume associated with the smart television, change a channel on the smart television, advance a slide or a song in an application executed on the smartphone, increase or decrease a temperature associated with the smart thermostat, answer a phone call or text message on the smartphone, respond to a notification on a social media application executed on a smartphone or a tablet, lock or unlock the smart lock, increase or decrease a volume of the smart speaker, and/or modify two-dimensional content or three-dimensional content on the smart device 108. It should be appreciated that these examples are provided for illustrative purposes only and other examples are contemplated.

In examples where the wearable device 104 is the ring being worn on the index finger of the user 102, the gesture component 148 of the wearable device 104 may allow the user 102 to use his/her fingers to control the smart device 108. The gesture component 148 may interpret signals from the one or more of the sensors (such as the pressure sensors 162) located on or affixed to the wearable device 104 to identify individual actions performed by the user 102. The individual actions performed by the user 102 may include touch gestures and/or non-touch gestures. Examples of the touch gestures may include touching a surface of an object (such as the smart device 108) with the index finger of the user 102 and/or sliding the index finger of the user 102 on the surface of the smart device 108, among others not explicitly listed herein. Examples of non-touch gestures may include the user 102 bending his/her index finger, moving his/her index finger in the air, and/or waving his/her index finger in the air, among others not explicitly listed herein.

The gesture component 148 may detect signals from the one or more sensors 160 to identify an individual action performed by the user 102. The gesture component 148 may then transmit the individual action via the wireless personal area network technology 182 to the smart device 108 to modify the parameter of the smart device 108. As a first illustrative example, the gesture component 148 may detect signals from the one or more sensors 160 to identify the individual action performed by the user 102 (e.g., the non-touch gesture of the user 102 bending his/her index finger while wearing the wearable device 104) and may transmit the individual action via the wireless personal area network technology 182 to the smart device 108 to modify the parameter of the smart device 108 (e.g., decrease the volume associated with the smart television). In a second illustrative example, the gesture component 148 may detect signals from the one or more sensors 160 to identify the individual action performed by the user 102 (e.g., the touch gesture of the user 102 sliding his/her index finger upwards on the surface of the smart device 108, e.g., a tablet) and may transmit the individual action via the wireless personal area network technology 182 to the smart device 108 to modify the parameter of the smart device 108 (e.g., increase the volume associated with the smart television). It should be appreciated that these examples are provided for illustrative purposes only and other examples not explicitly described herein are contemplated.

In additional examples, the individual action performed by the user 102 may be a gesture input action. Such gesture input action may include movement of the finger of the user 102, the hand of the user 102, and/or the arm of the user 102. A non-exhaustive list of gesture input actions includes: a clockwise or a counterclockwise circular gesture input action by the finger of the user 102 (e.g., to turn on a light), a movement of the finger of the user 102 in a triangular motion, a stop gesture input action by the hand of the user 102 (e.g., to pause a song), an "X"-shaped gesture input action by the finger of the user 102, a movement of the finger or the hand of the user 102 in an upwards direction (e.g., to increase a volume of a song or a brightness of a light), a movement of the finger or the hand of the user 102 in a downward direction (e.g., to decrease the volume of the song or the brightness of the light), and/or a flick or swipe of the hand of the user 102 in a leftward direction or a rightward direction (e.g., to move progress of a presentation forward or backward), among others.

Figure 1B:
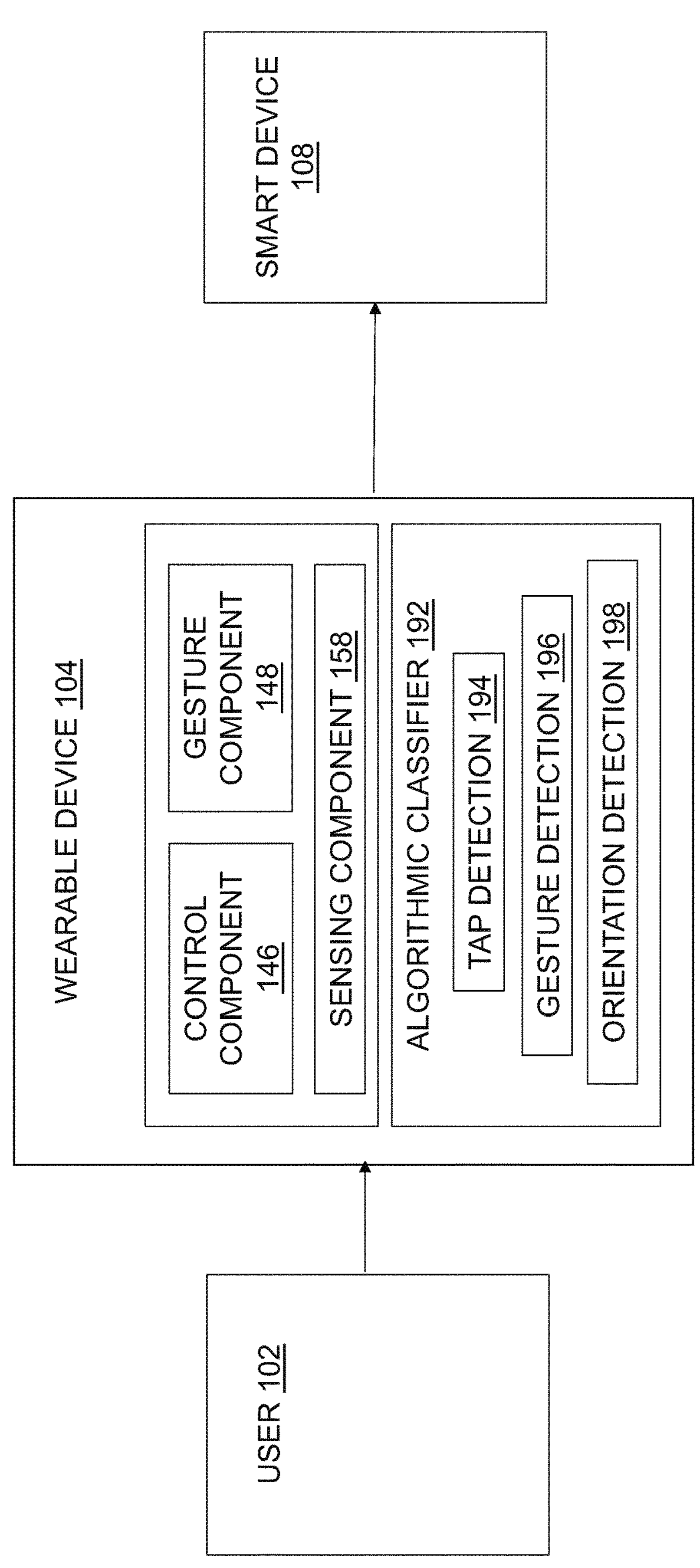
FIG. 1B depicts a block diagram of a system, the system comprising at least a wearable device, where the wearable device comprises at least an algorithmic classifier, according to at least some embodiments disclosed herein.
Figure 1C:
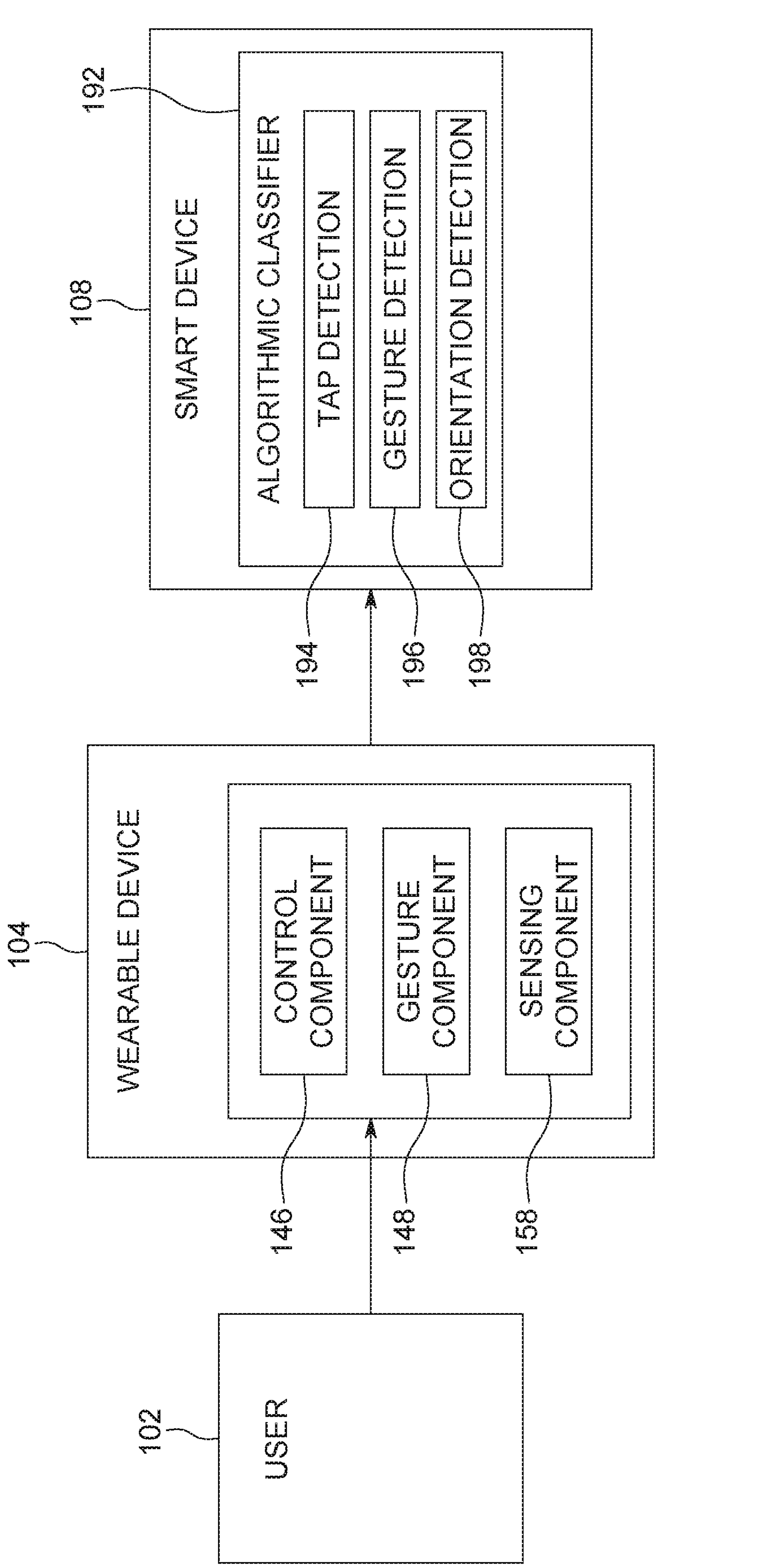
FIG. 1C depicts a block diagram of a system, the system comprising at least a smart device, where the smart device comprises at least an algorithmic classifier, according to at least some embodiments disclosed herein.
Figure 1D:
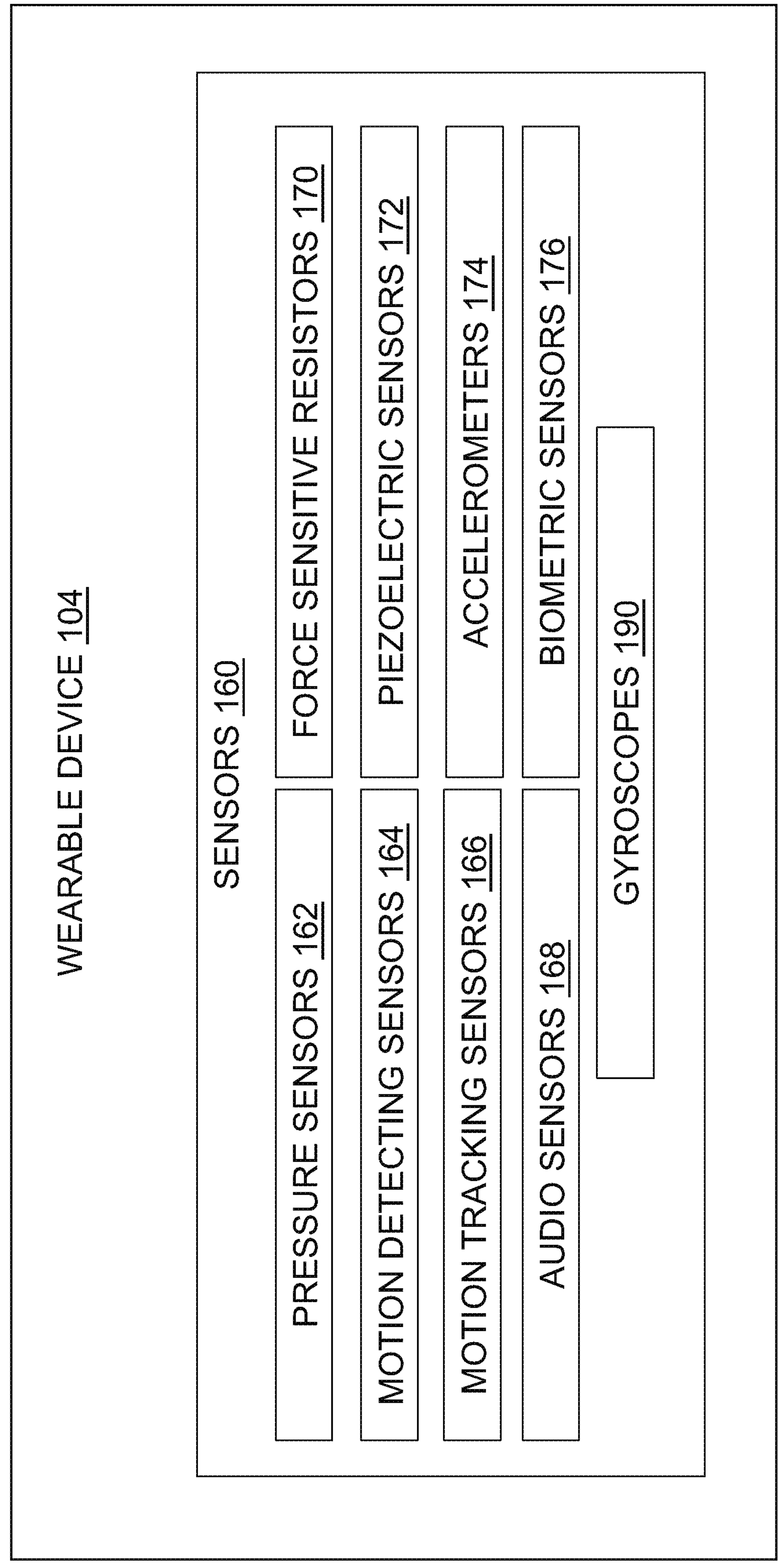
FIG. 1D depicts a block diagram of sensors of at least one component of a system, according to at least some embodiments disclosed herein.
Figure 1E:
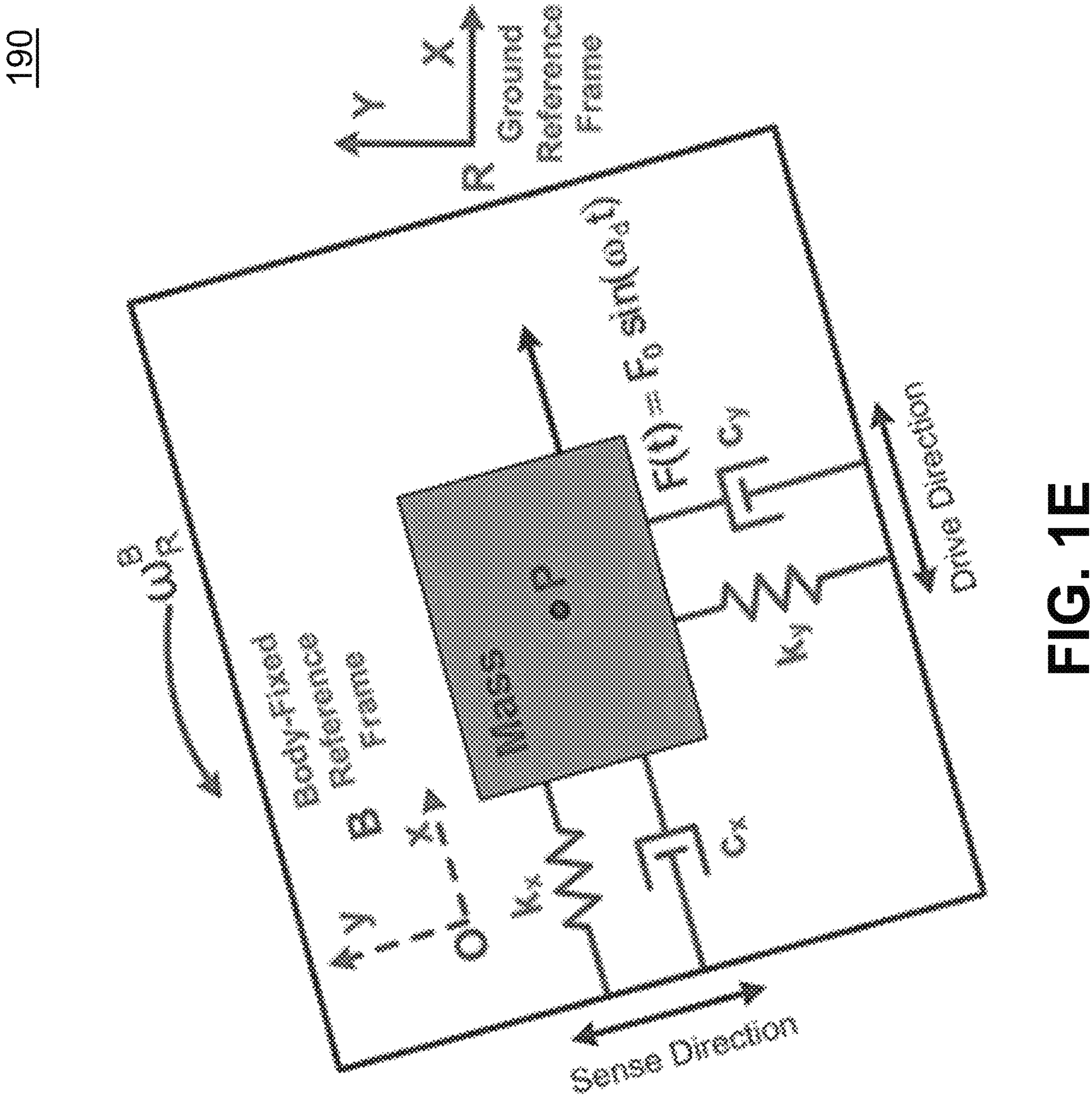
FIG. 1E depicts a schematic diagram of a micromachined microelectromechanical systems (MEMS) gyroscope for use within a system, according to at least some embodiments disclosed herein.
Figure 2:
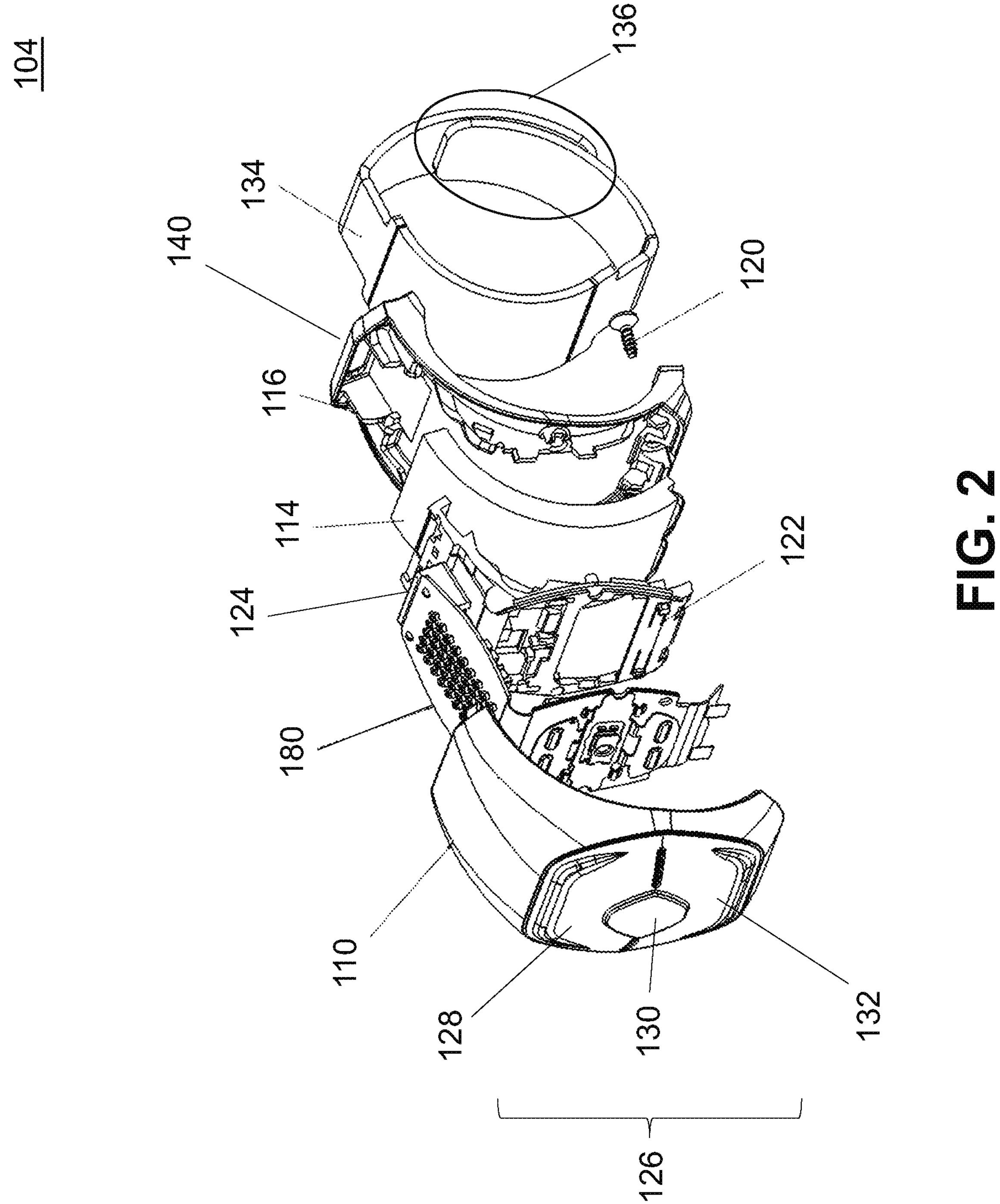
FIG. 2 depicts an exploded view of a wearable device, according to at least some embodiments disclosed herein.
Figure 3:
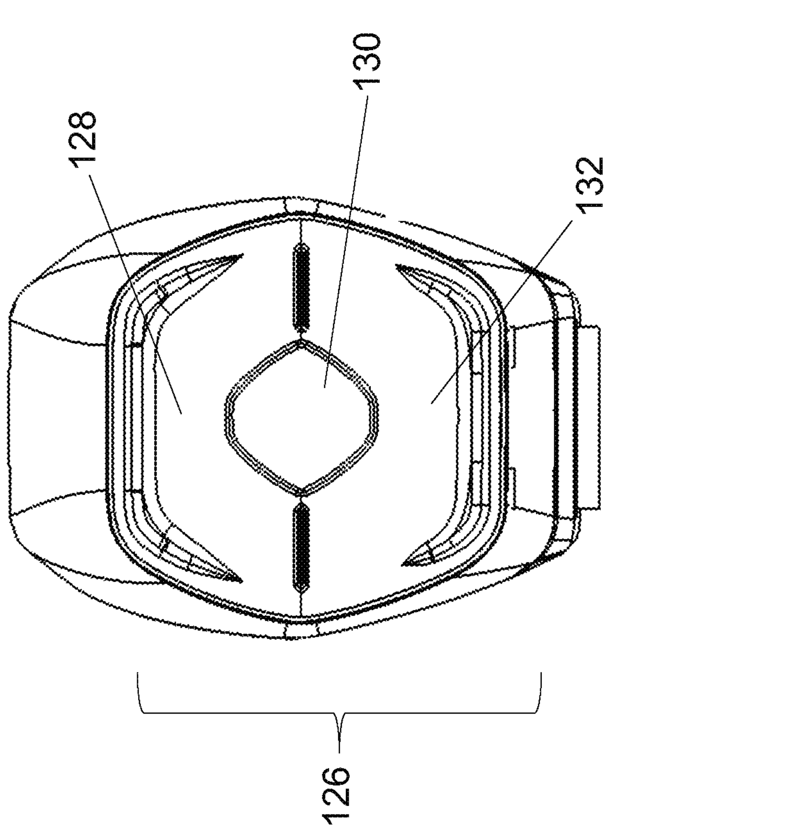
FIG. 3 depicts a front perspective view of a wearable device, according to at least some embodiments disclosed herein.
Figure 4:
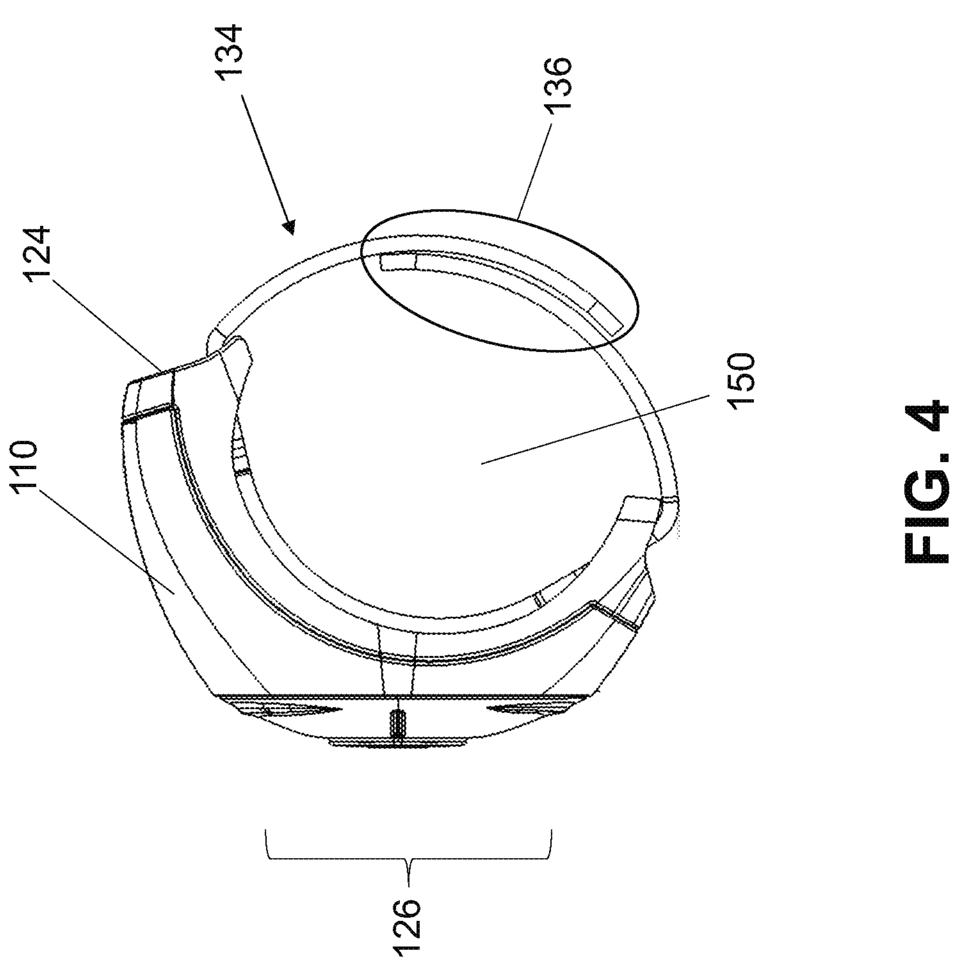
FIG. 4 depicts a side perspective view of a wearable device, according to at least some embodiments disclosed herein.
Figure 5:
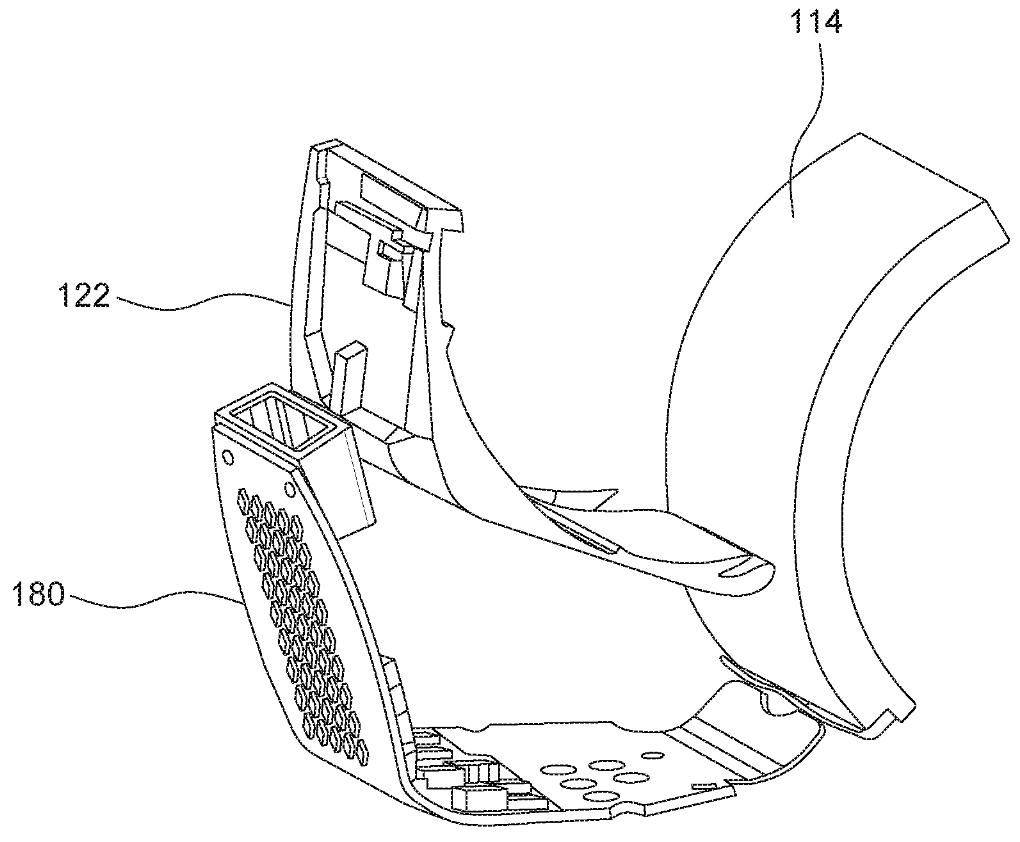
FIG. 5-FIG. 9 depict side views to assemble a portion of a wearable device, according to at least some embodiments disclosed herein.
Figure 6:
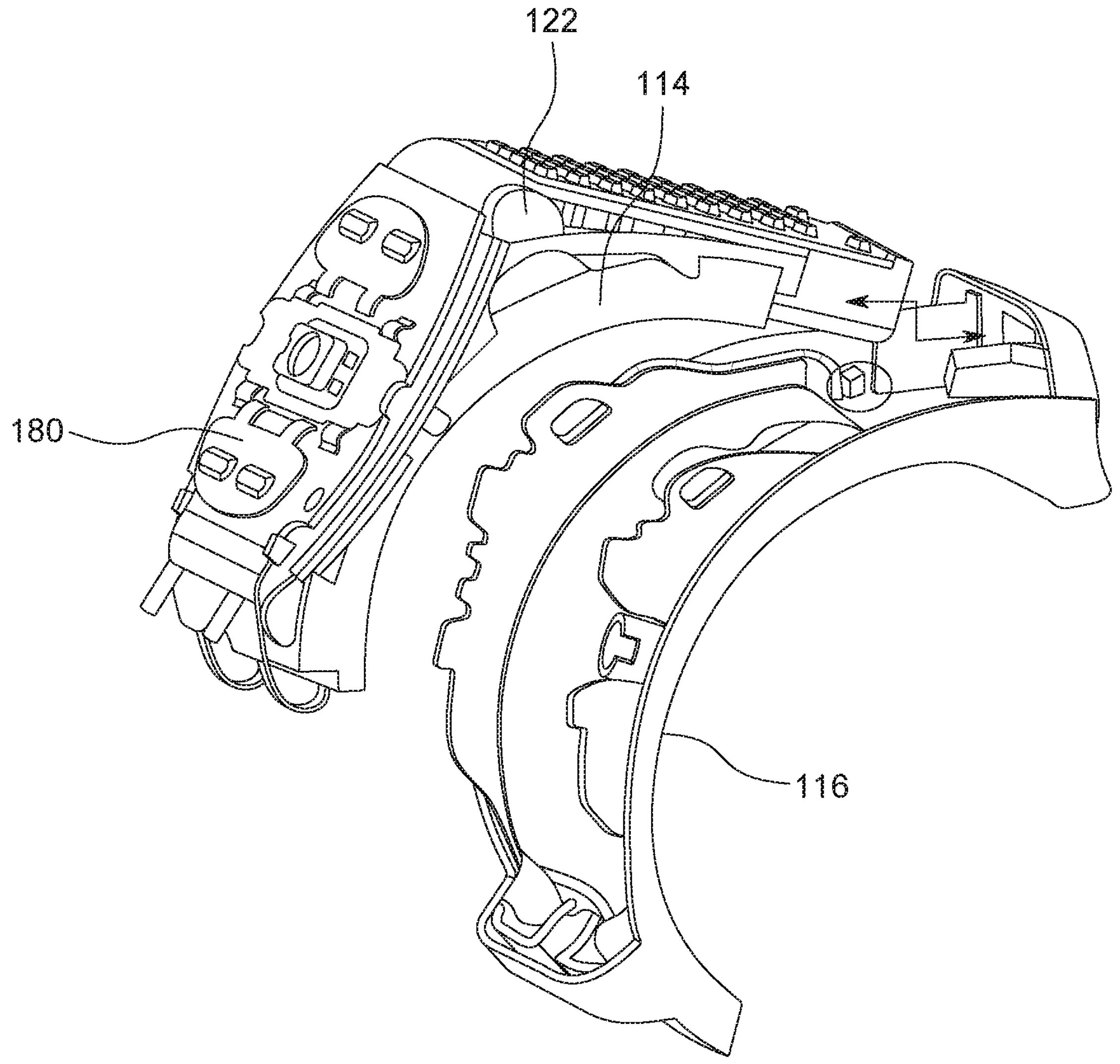
Figure 7:
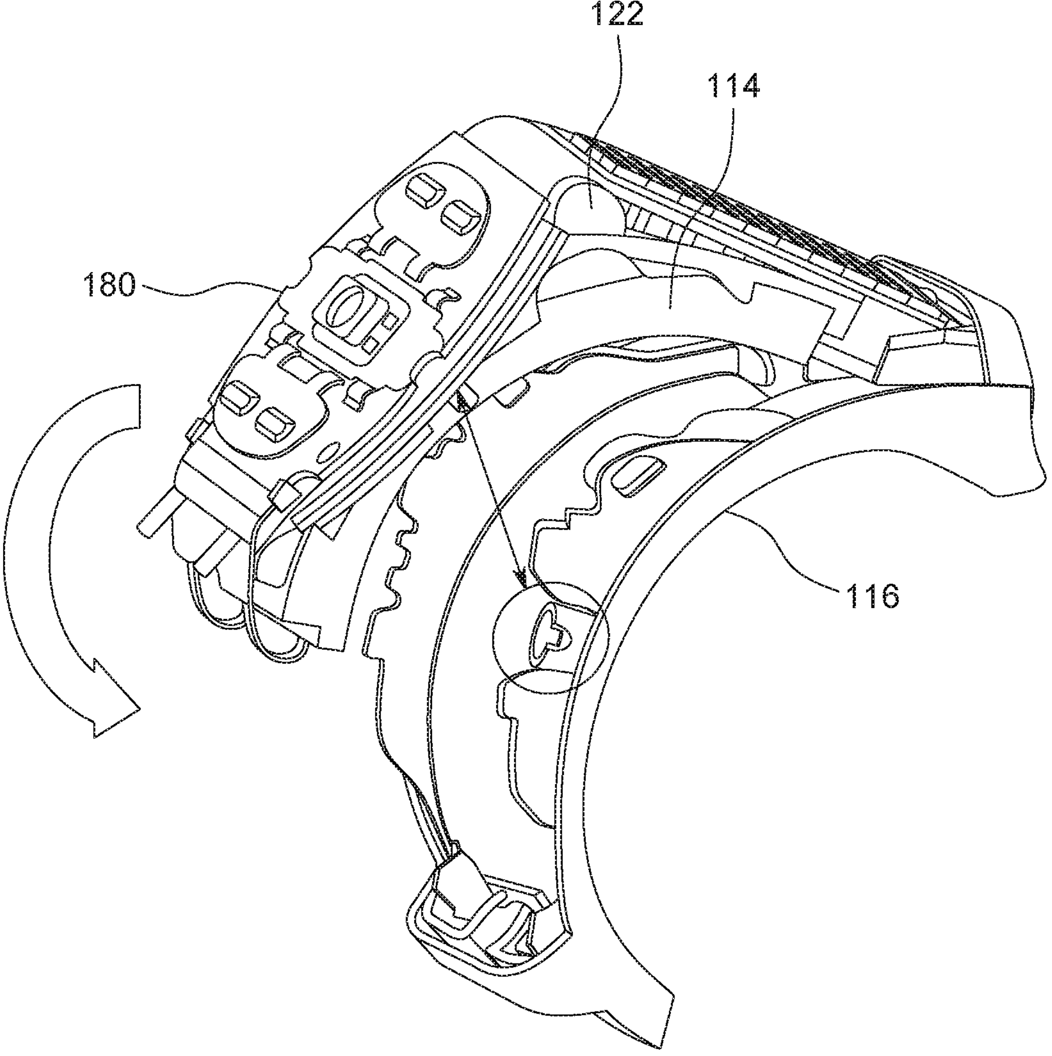
Figure 8:
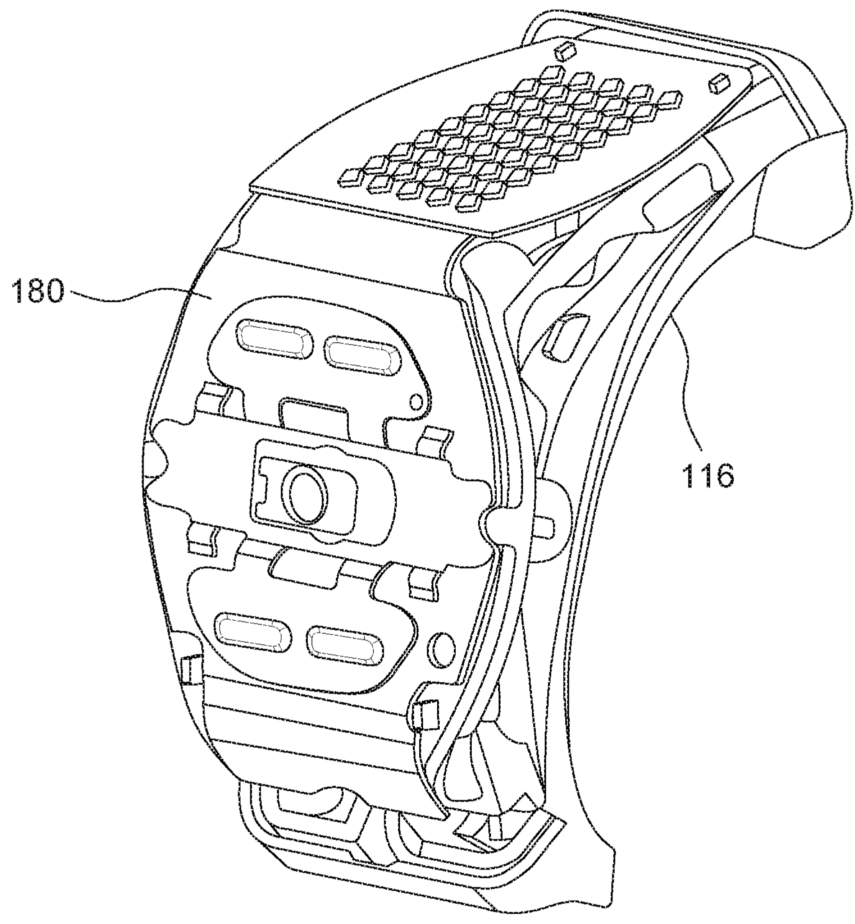
Figure 9:
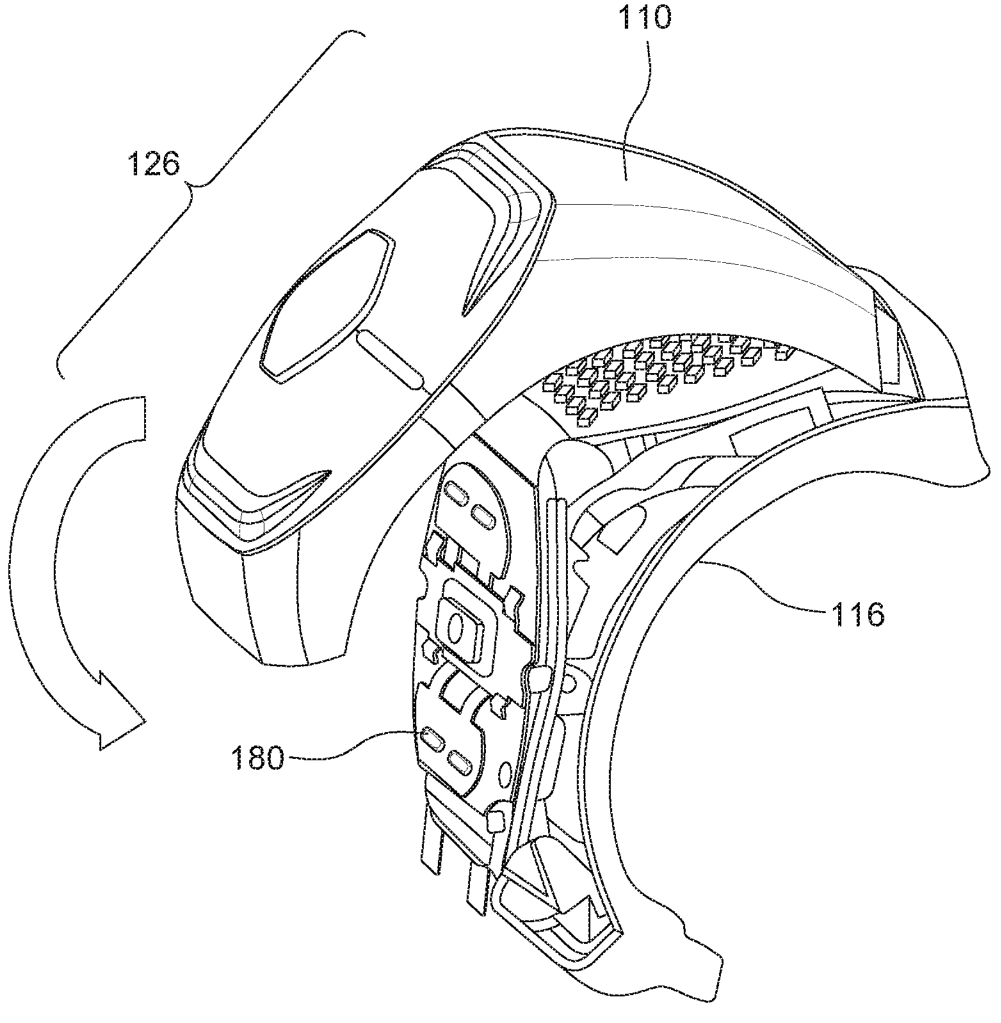
Figure 10:
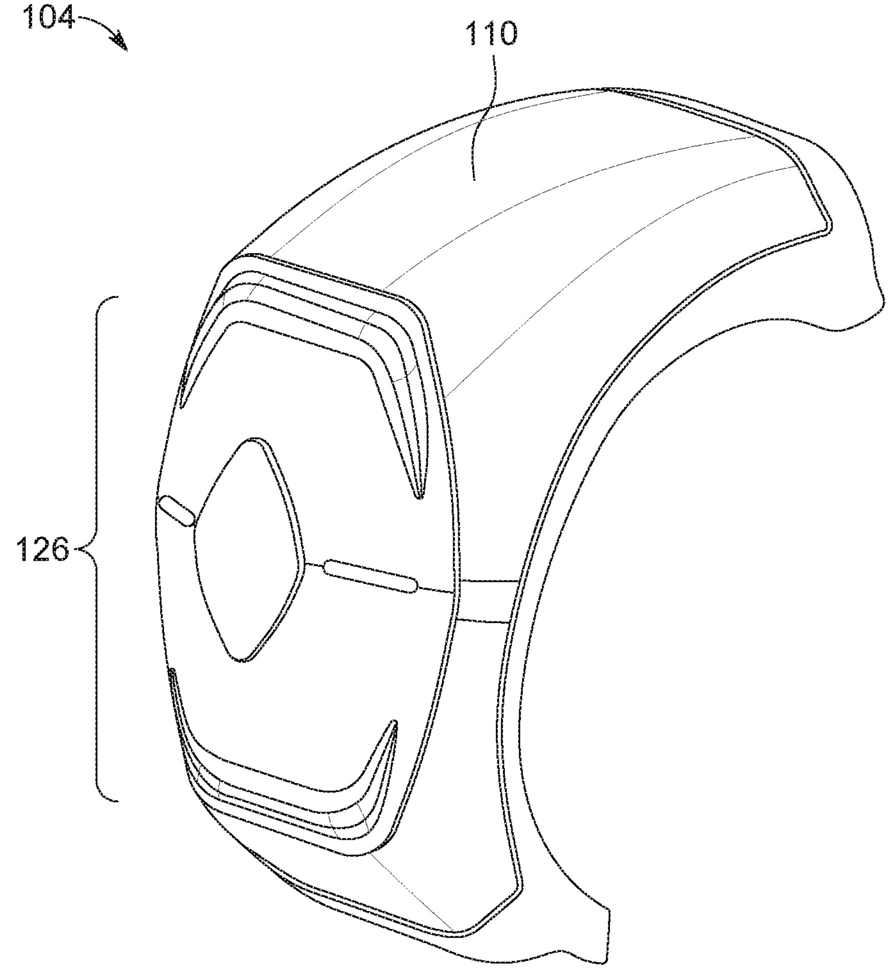
FIG. 10 depicts a side perspective view of a portion of a wearable device, according to at least some embodiments disclosed herein.
Figure 11:
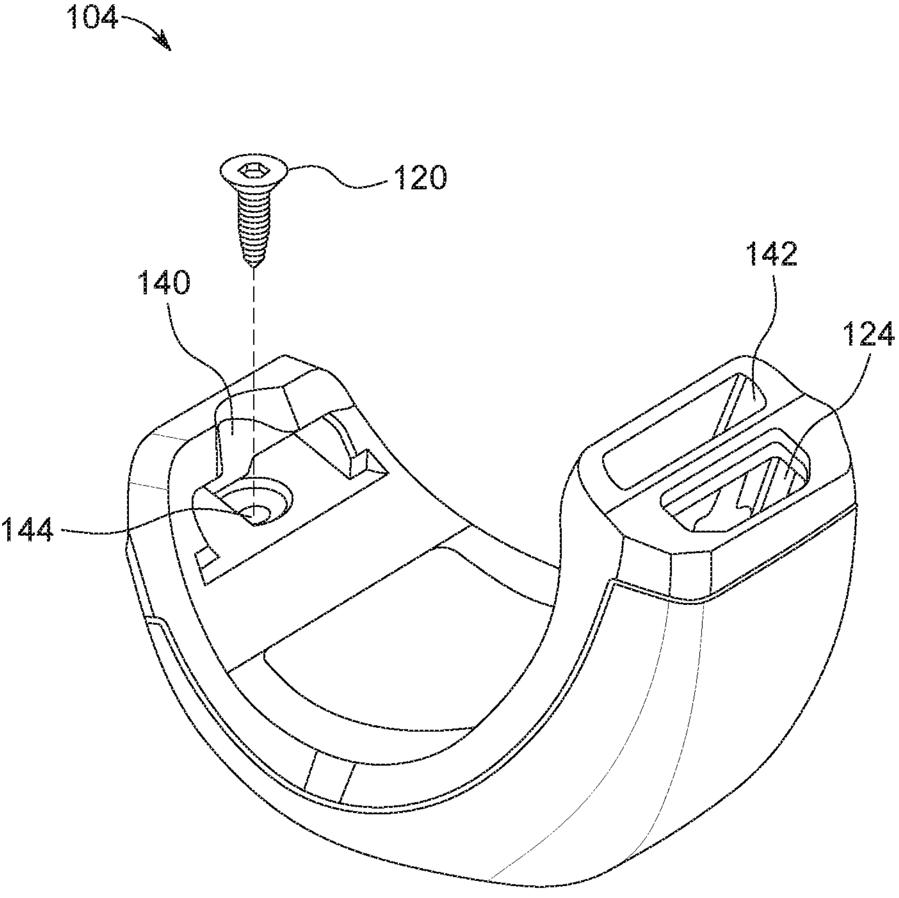
FIG. 11 depicts a rear perspective view of a portion of a wearable device, according to at least some embodiments disclosed herein.

The gesture input action from the user 102 is bound to the modification of the parameter of the smart device 108 by means of one or more algorithmic classifiers 192 (as depicted in FIG. 1B and FIG. 1C). In examples, at least one of the one or more algorithmic classifiers 192 comprises a machine learning classifier. The array of algorithms are used to process data (e.g., gesture detection data 196, tap detection data 194, sensor fusion data that determines orientation 198, etc.) from onboard motion sensors (e.g., the accelerometers 174 and the gyroscopes 190). Data processing is performed using proprietary algorithms, e.g., to obtain the orientation of the wearable device 104, to detect finger taps of the user 102 on any surface, and/or to detect energy saving motions by the user 102, among others. These algorithms may be processed either on the wearable device 104 via embedded software (see, FIG. 1B) or on the receiving device (e.g., the smart device 108) (see, FIG. 1C). In some examples, software, configured to interact with the wearable device 104, may be executable on the smart device 108. The software may run on MacOSX, Windows 10, and Linux. Further, a communication layer may be associated with the software.

Furthermore, motion sensor data from the one or more sensors 160 can be processed using machine learning to perform real-time gesture detection. In particular, the motion sensor data from the one or more sensors 160 can be processed using time-series classification to perform the real-time gesture detection. These gestures while wearing the wearable device 104 can be bound to certain actions (e.g., to modify the one or more parameters) on the smart device 108.

As described herein, "machine learning" is a subset of artificial intelligence and is the study of computer algorithms that improve automatically through experience. Machine learning algorithms build a mathematical model based on sample data (or "training data") in order to make predictions or decisions, without being explicitly programmed to do so.

As defined herein, a "time series data set" is a data set which represents some measurements of a quantity over a time period. The behavior of the series heavily depends on the order of the points. Time series analysis includes developing statistical models to provide reasonable explanations regarding sample data. These models can be developed using various machine learning technologies.

As defined herein, "time series classification" deals with classifying data points over a time period based on its' behavior. Time series classification is a problem in the field of data mining. See, Q. Yang, et al., "10 Challenging Problems in Data Mining Research," Inf Technol Decis Mak, 2006, 5(4), Pages 597-604, the contents of which are hereby incorporated by reference in its entirety. With the increase of temporal data availability, numerous time series classification algorithms have been proposed. See, D F Silva, et al., "Speeding Up Similarity Search Under Dynamic Time Warping By Pruning Unpromising Alignments," 2018, Data Min Knowl Discov, 32(4), Pages 988-1016, the contents of which are hereby incorporated by reference in its entirety.

Due to their natural temporal ordering, time series data are present in almost every task that requires some sort of human cognitive process. See, M. Längkvist, et al., "A Review of Unsupervised Feature Learning and Deep Learning For Time-Series Modeling," Pattern Recognit Lett, 2014, 42, Pages 11-24, the contents of which are hereby incorporated by reference in its entirety. Any classification problem using data that is registered taking into account some notion of ordering can be cast as a time series classification problem. Time series are encountered in many real-world applications, such as human activity recognition, acoustic scene classification, cyber-security, and electronic health records. See, H. F. Nweke, et al., "Deep Learning Algorithms for Human Activity Recognition Using Mobile and Wearable Sensor Networks: State of the Art And Research Challenges," Expert Syst Appl, 2018, 105, Pages 233-261, the contents of which are hereby incorporated by reference in its entirety. Human activity recognition systems are developed as part of a framework to enable continuous monitoring of human behaviors. The extraction of relevant features is the most challenging part of the mobile and wearable sensor-based human activity recognition pipeline. See, H. F. Nweke, et al.

Solutions to the problem of time series classification include use of a nearest neighbor (NN) classifier coupled with a distance function, Dynamic Time Warping (DTW) distance when used with a NN classifier, deep neural networks, pattern extraction, and weighted dynamic time warping, among others. See, A. Bagnall, et al., "The great time series classification bake off: a review and experimental evaluation of recent algorithmic advances," Data Min Knowl Discov, 2017, 31(3), Pages 606-660; J. Lines, et al., "Time series classification with ensembles of elastic distance measures," Data Min Knowl Discov, 2015, 29(3), Pages 565-592; Hassan Ismail Fawaz, et al., "Deep Learning for Time Series Classification: a Review," Data Mining and Knowledge Discovery, 2019, 33, Pages 917-963; Pierre Geurts, "Pattern Extraction for Time Series Classification," European Conference on Principles of Data Mining and Knowledge Discovery, 2011, Pages 115-127; Young-Seon Jeong, et al., "Weighted Dynamic Time Warping for Time Series Classification," Pattern Recognition, 2011, 44(9), Pages 2231-2240, the contents of which are hereby incorporated by reference in their entirety.

It should further be appreciated that, in response to receiving the input from the user or in response to recognizing the gesture input by the one or more algorithmic classifiers 192, a haptic response is provided by the wearable device 104 to the user 102. As described herein, "haptic feedback" refers to any technology that can create an experience of touch by applying forces, vibrations, or motions to the user 102. As defined herein, "haptic feedback" refers to the use of touch to communicate with the user 102. As such, the wearable device 104 comprises one or more tactical sensors that measure forces exerted by the user 102 on the interface. Examples of haptic feedback include the vibration of a mobile device or a rumble from a game controller. It should be appreciated that the examples of haptic feedback provided herein are for illustrative purposes only and are not exhaustive.

In additional examples, the sensing component 158 may include the biometric sensors 176. As described herein, each of the biometric sensors 176 refers to a suitable device that can sense a biometric feature of the user 102 while the user 102 is wearing the wearable device 104. In one embodiment, a sensor of the biometric sensors 176 takes the form of a fingerprint sensor that is configured to sense a fingerprint (e.g., when the wearable device 194 is placed over the finger, such as the index finger, of the user 102). Examples of other biometric features that can be sensed by the biometric sensors 176 instead of or in addition to a fingerprint include, but are not limited to, a finger vein, an oxygen saturation level, a pulse, a quantity of calories burned, and a heartbeat pattern. Of course, these are merely examples, and other types of the biometric sensors 176 can be used to sense other types of biometric features.

The biometric sensors 176 may assist the sensing component 158 in detecting pressure imparted by the body part of the user 102 while the user 102 is wearing the wearable device 104. The sensing component 158 may measure one or more parameters (e.g., biometric parameters) of the user 102 and may transmit the one or more biometric parameters via the wireless personal area network technology 182 to the smart device 108. As an illustrative example, the biometric sensors 176 may assist the sensing component 158 in detecting the pressure imparted by the body part of the user 102 (e.g., the index finger of the user 102) while the user 102 is wearing the wearable device 104 (e.g., the ring), measuring the one or more biometric parameters (e.g., a quantity of calories burned during a time period and a pulse of the user 102), and transmitting the one or more biometric parameters of the quantity of calories burned during the time period and the pulse of the user 102 via the wireless personal area network technology 182 to an application executed on the smart device 108 (e.g., the smartphone). The application executed on the smartphone may receive the one or more biometric parameters and may store these biometric parameters. The application executed on the smartphone may also utilize the received one or more biometric parameters for further analysis or other purposes.

It should be appreciated that the one or more sensors 160 described herein are part of a printed circuit board 180 located in the interior of the wearable device 104. In this embodiment, the printed circuit board 180 comprises a controller, non-volatile memory, a wireless chip, an antenna 188, user interface element(s), and the rechargeable battery 114, which are all operatively in communication with one another. The "operatively in communication with" could mean directly in communication with or indirectly (wired or wireless) in communication with through one or more components, which may or may not be shown or described herein. It should be noted that these components are merely examples and fewer or more components can be used.

In general, the non-volatile memory is configured to store information from an authorized user, such as detected user actions, detected or sensed biometric parameters, etc. The non-volatile memory can include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

In some examples, the one or more sensors 160 may detect the input action performed by the user 102, the gesture action performed by the user 102, and/or the biometric parameters of the user 102 and may determine whether the actions or the biometric features detected match actions or biometric features stored in the memory. If there is a match, the controller is configured to enable a function of the wearable device 104. The controller can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller can be configured with hardware and/or firmware to perform the various functions described herein.

As used herein, a "function" of the wearable device 104 can take any suitable form. For example, in some embodiments, the wearable device 104 can have one or more of the following functions: accessing user data stored in a memory of the wearable device 104, opening a door, making a payment, authenticating a secure application in the smart device 108 in communication with the wearable device 104, and controlling an application in or receiving an alert from the smart device 108 in communication with the wearable device 104. In another embodiment, the function is turning the wearable device 104 on or waking the wearable device 104 up from a sleep mode (where some other functions of the wearable device 104 (e.g., a displayed clock) can still be enabled even though others are not). In one embodiment, the function of the wearable device 104 is performed using the wireless chip and/or the antenna 188 (together referred to as a wireless transceiver (e.g., for near field communications (NFC)) to send and receive communications with the wearable device 104. The user interface element(s) can be related or unrelated to the function. For example, in one embodiment, the user interface element is a display device that displays the current time irrespective of whether an authorized user is wearing the wearable device 104. In examples, the display device is a visual display. As another example, the user interface element can be a buzzer/vibrator, LED light, an OLED light, an LCD light, etc. that provides an authorized user with an alert from a paired smart device 108. Since the wearable device 104 enables a function only if the action detected, the gesture detected, or the biometric feature sensed by the one or more sensors 160 matches the biometric feature or the actions stored in the memory, this ensures that functions of the wearable device 104 can be enabled only for its true owner.

The wearable device 104 may store a plurality of actions and/or biometric features of the user 102, where each action or each biometric feature is associated with a different function of the wearable device 104. For example, fingerprints of two or more of the user's fingers can be stored in the wearable device 104 and associated with different functions. That way, a different function can be enabled depending on which finger the user 102 puts the wearable device on. As another alternative, three-dimensional functions can be enabled/disabled based on the direction of movement of the wearable device 104 as sensed by movement across finger segments.

Also, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. The substrate may include a semiconductor.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (e.g., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

In a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As an example, the substrate may include a semiconductor. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. Memory devices may have circuitry used for controlling and driving memory elements to accomplish functions, such as programming and reading. This associated circuitry may be on the same substrate as the memory elements and/or on a separate substrate. For example, a controller for memory read-write operations may be located on a separate controller chip and/or on the same substrate as the memory elements.

Figure 13:
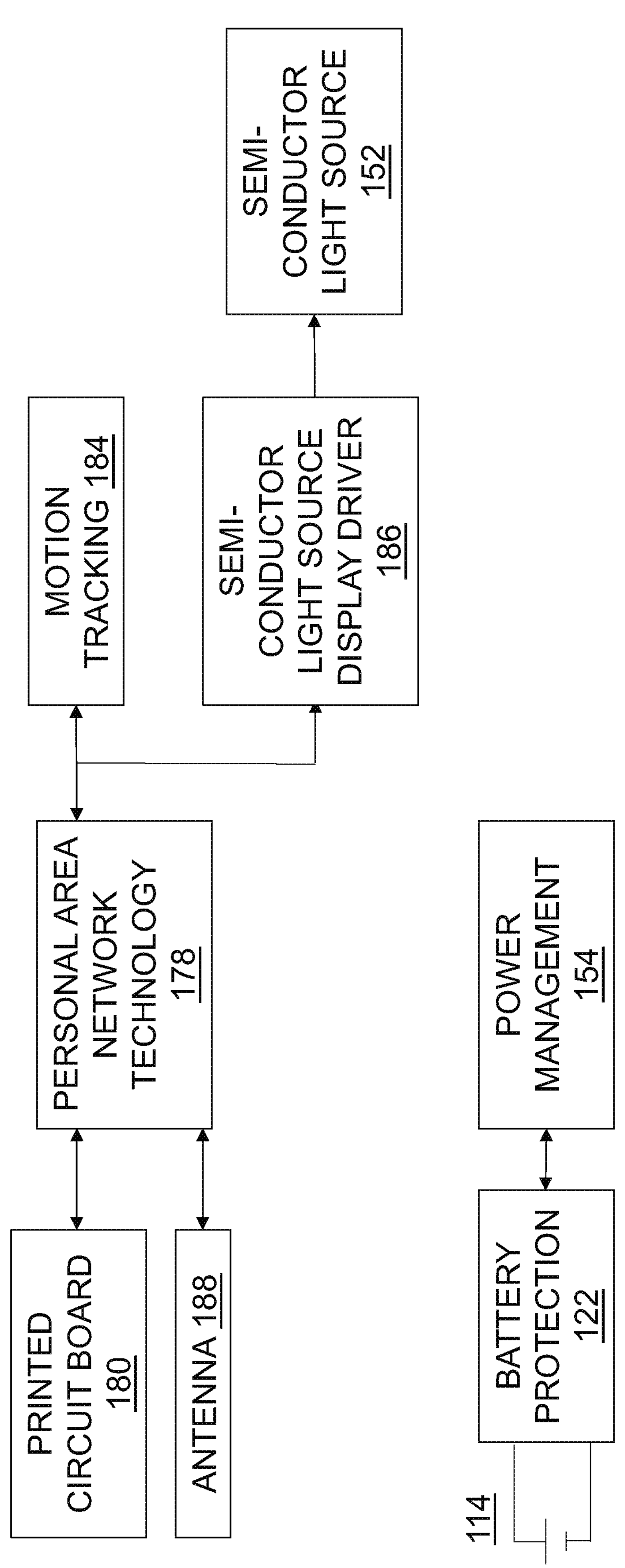
FIG. 13 depicts a block diagram of components of a system, according to at least some embodiments disclosed herein.

In a preferred embodiment and as depicted in at least FIG. 13, the electronics of the wearable device 104 may be assembled on the printed circuit board 180 located in the interior of the wearable device 104 and consisting of baseband hardware and radio frequency electronic circuits. The main control unit of the wearable device 104 is a semiconductor that provides computing, storage, and Bluetooth Low Energy radio services. The printed circuit board 180 includes a Bluetooth LE SoC chip, a battery protection chip, a motion tracking chip, a micro USB connector for charging purposes, an LED driver chip, and a battery charger chip.

The components of the wearable device 104, as depicted in FIG. 13, may also include: an antenna 188, the personal area network technology 182, a motion tracking device 184, a semi-conductor light source display driver 186 (e.g., an LED display driver), a semi-conductor light source 152, the battery 114, the battery support/protection component 122, and a power management component 154. The antenna 188 is integrated into the printed circuit board 180. In examples, the antenna 188 is a printed wiring board (PWB) strip line (IFA) antenna 188 with a maximum gain of −5.4 dBi and is implemented in two layers in the printed circuit board 180. The motion tracking device 184 is a 9-Axis Micro-Electro-Mechanical Systems (MEMS). The semi-conductor light source 152 comprises white LED's. In some examples, the semi-conductor light source 152 is an LED matrix display.

Figure 22:
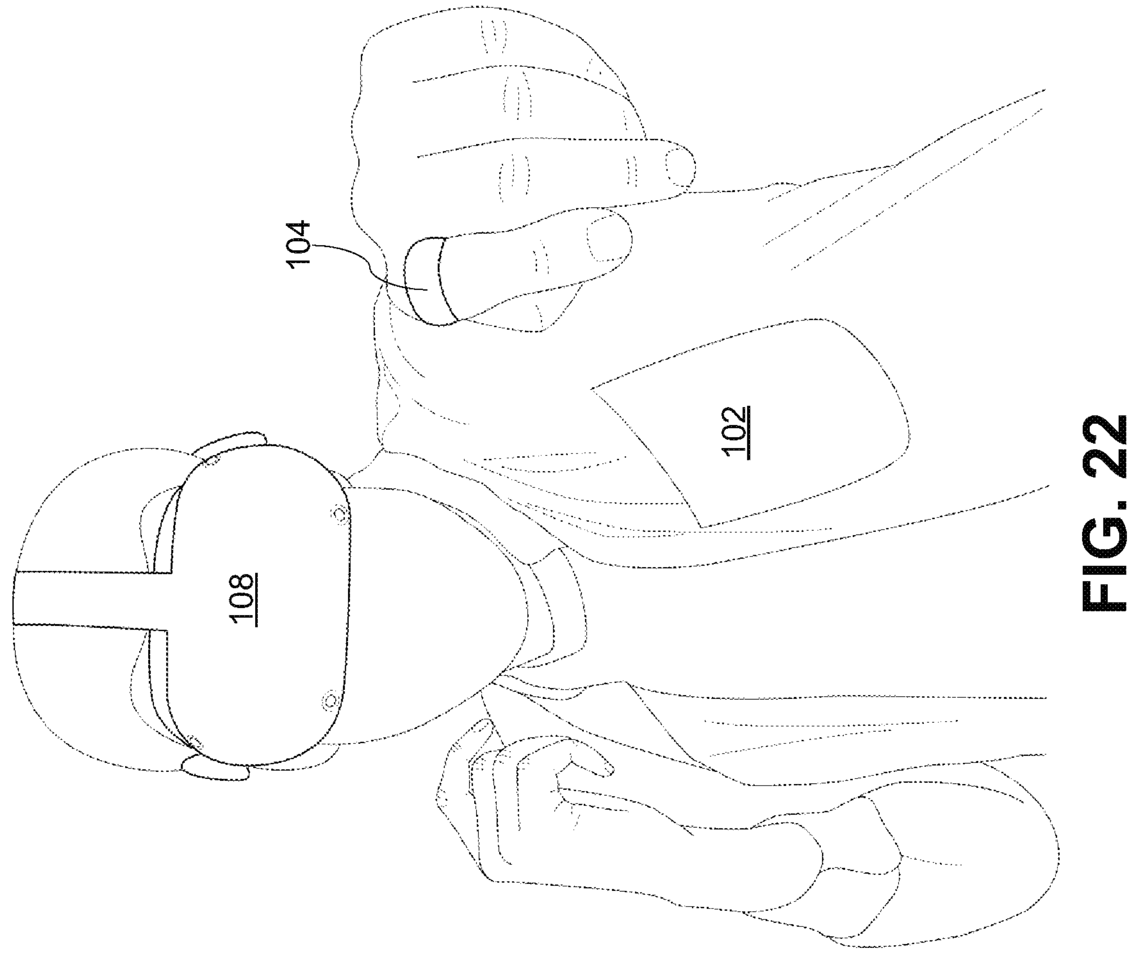
FIG. 22 depicts a schematic diagram showcasing a wearable device interacting with a smart device (e.g., a virtual reality (VR) headset), according to at least some embodiments disclosed herein.
Figure 23:
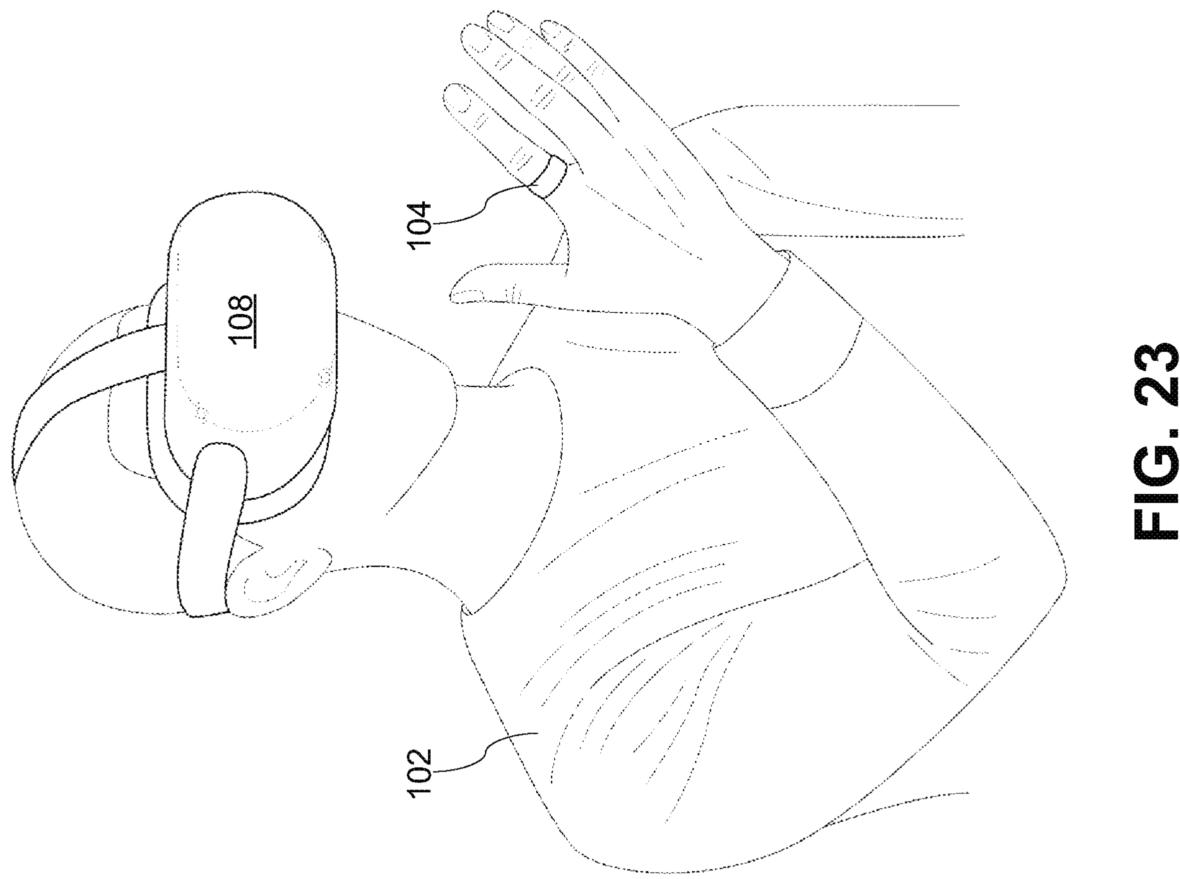
FIG. 23 depicts another schematic diagram showcasing a wearable device interacting with a smart device (e.g., the VR headset), according to at least some embodiments disclosed herein.
Figure 24:
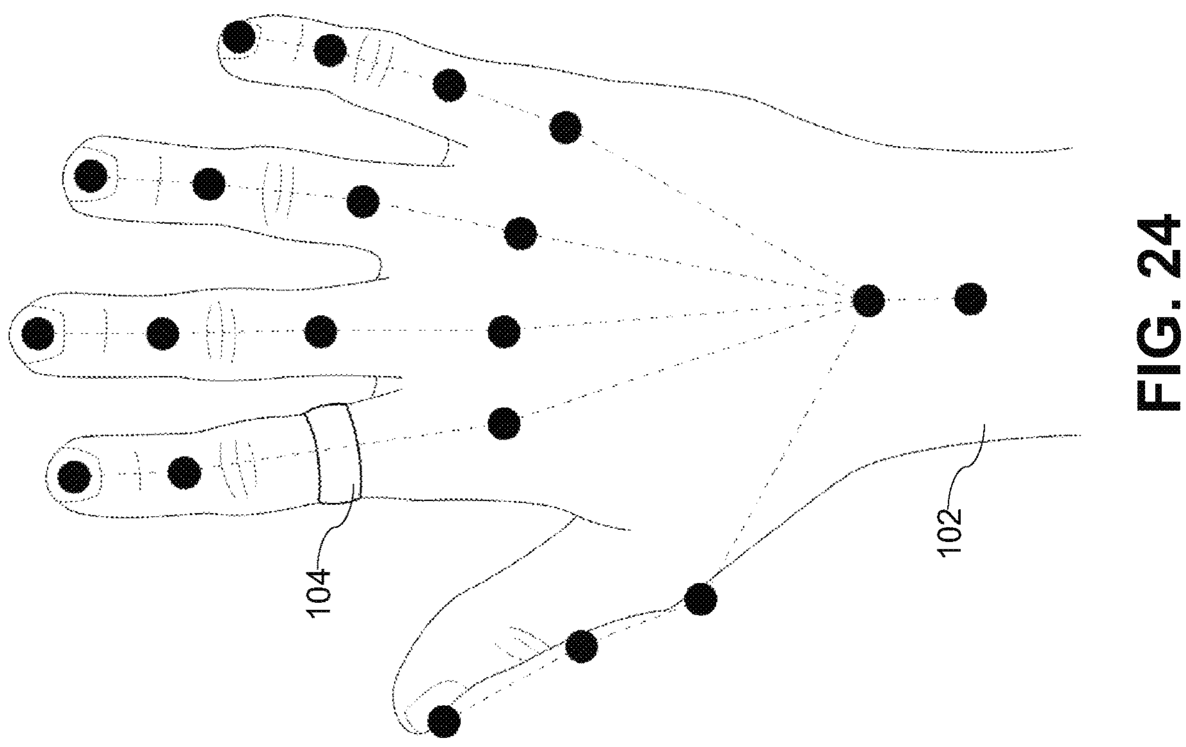
FIG. 24 depicts a schematic diagram of a user's hand wearing a wearable device associated with the gesture recognition use case of FIG. 19, according to at least some embodiments disclosed herein.
Figure 25:
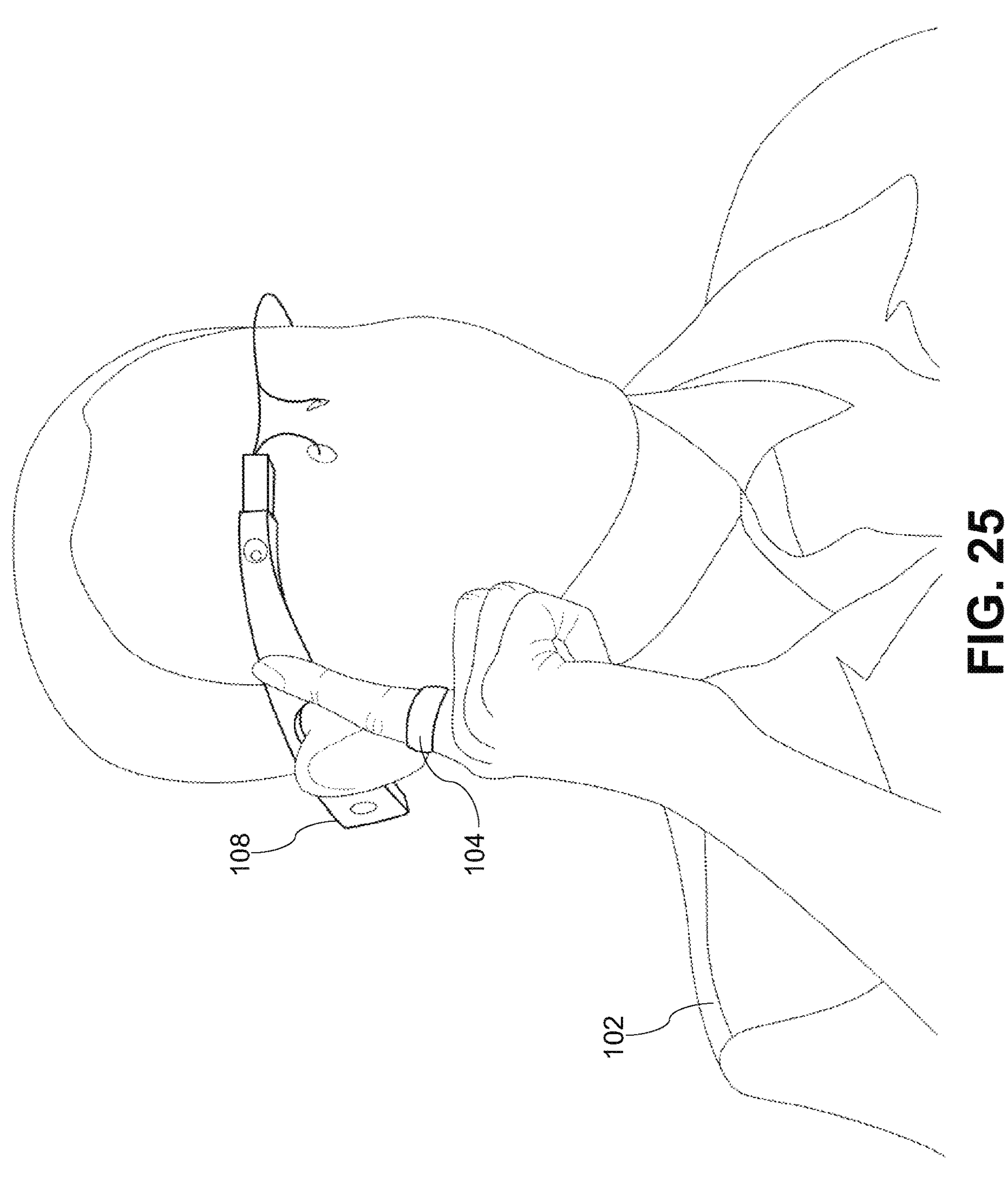
FIG. 25 depicts a schematic diagram showcasing a wearable device interacting with a smart device (e.g., smart glasses), according to at least some embodiments disclosed herein.
Figure 26:
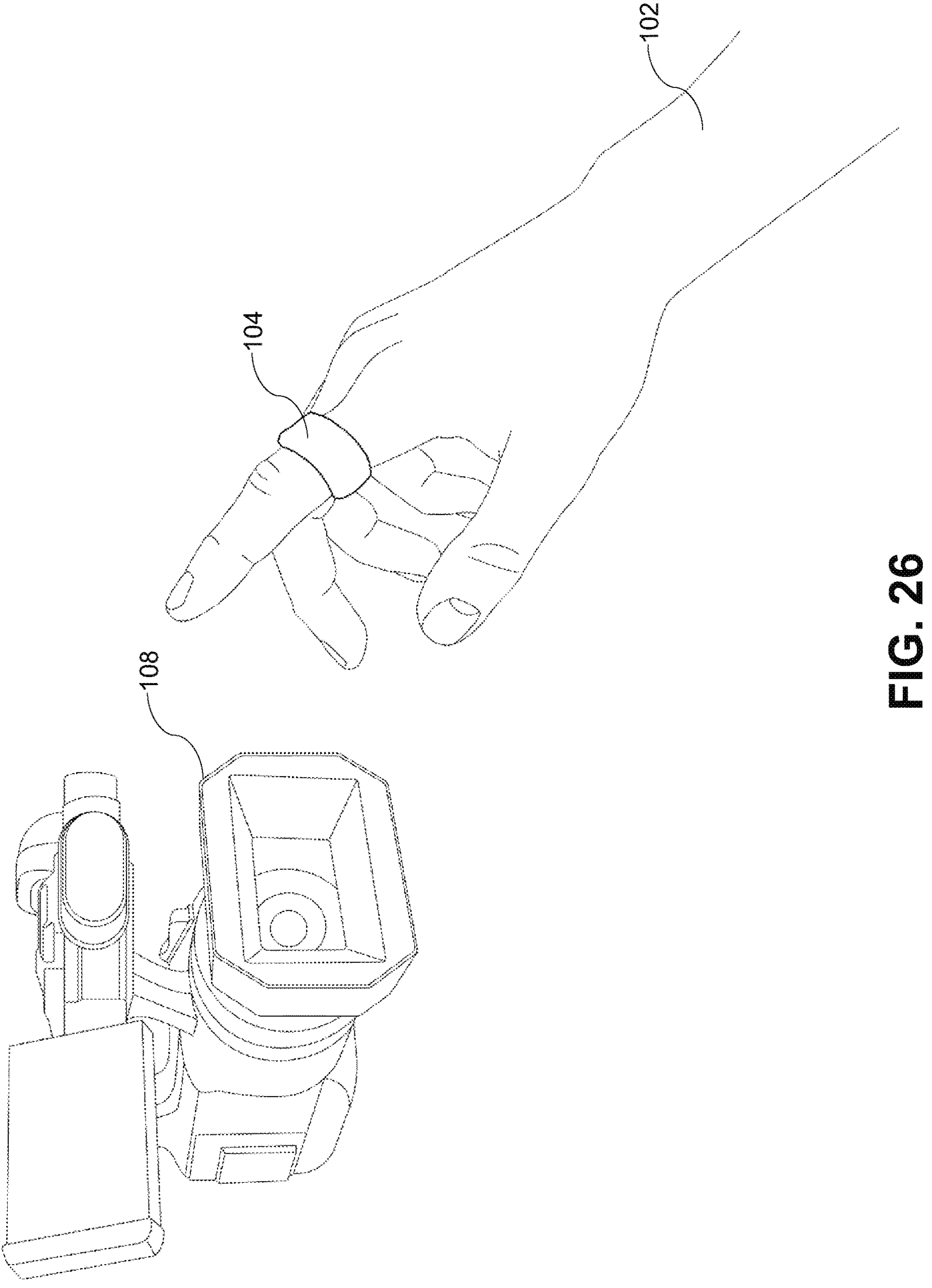
FIG. 26 depicts a schematic diagram showcasing a wearable device interacting with a smart device (e.g., a camcorder), according to at least some embodiments disclosed herein.
Figure 27:
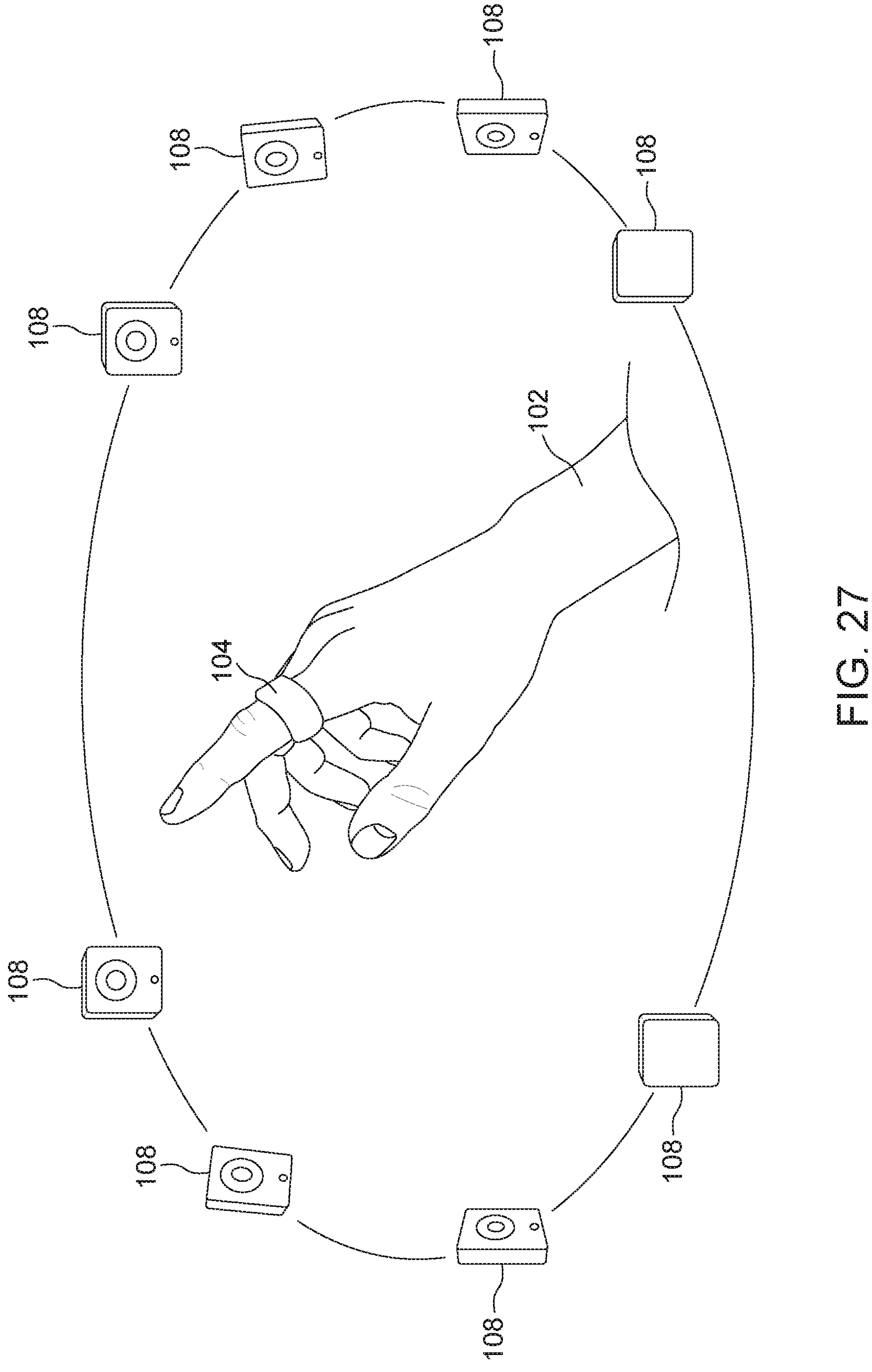
FIG. 27 depicts a schematic diagram showcasing a wearable device interacting with multiple smart devices, according to at least some embodiments disclosed herein.
Figure 28:
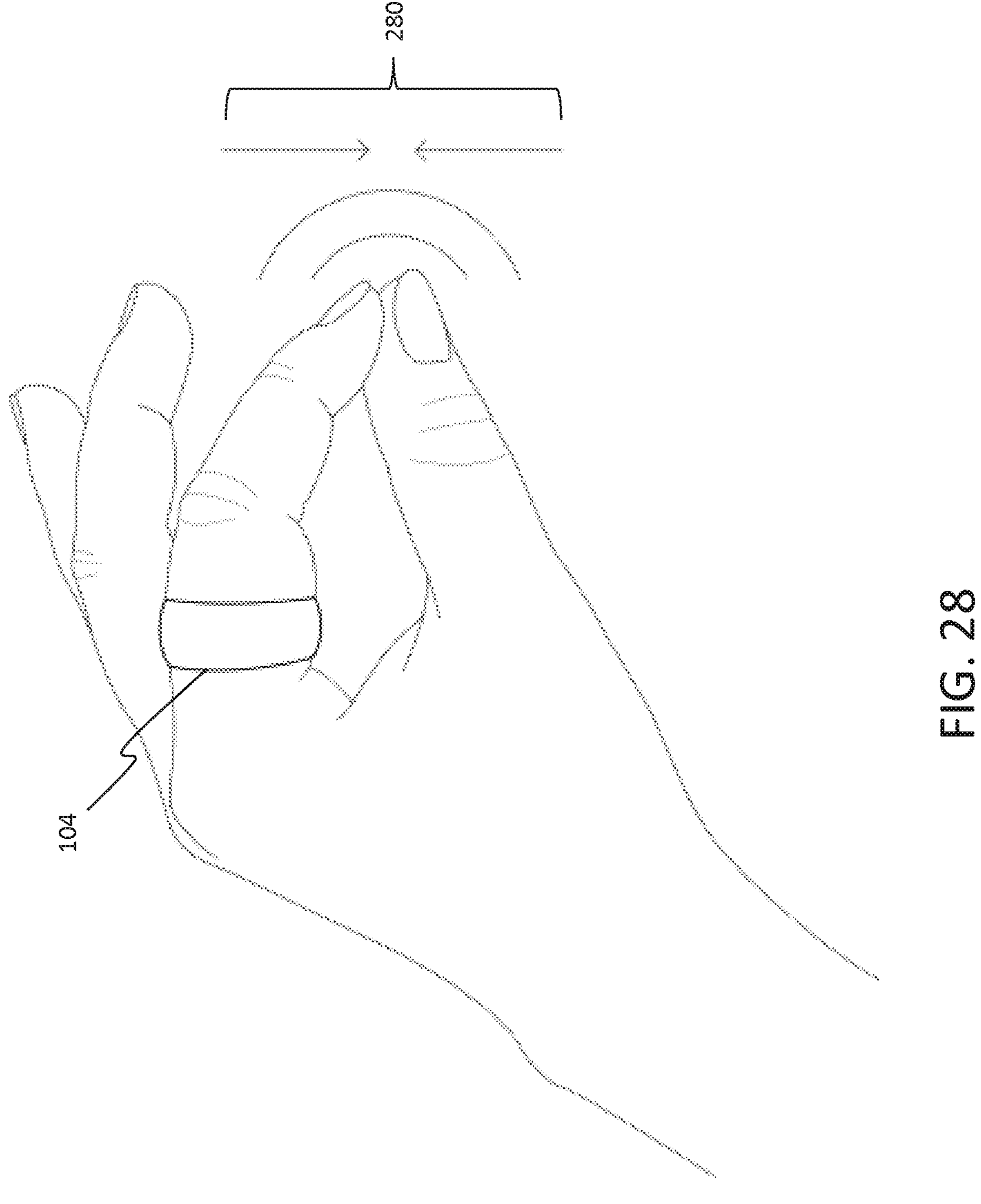
FIG. 28 depicts a user's hand wearing a wearable device associated with realizing a pinch gesture.
Figure 31:
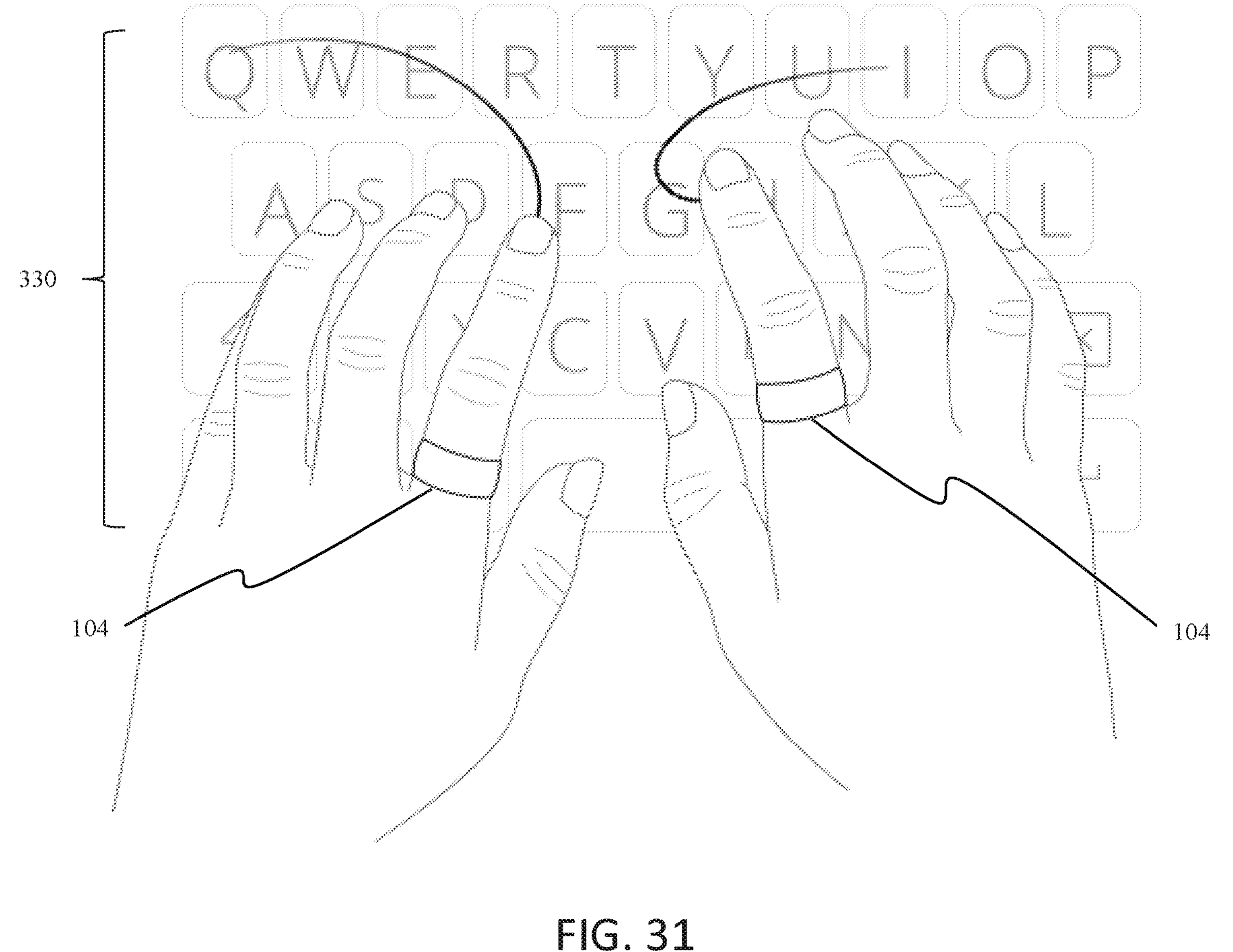
FIG. 31 depicts a user's hands operating a second example virtual keyboard.
Figure 32:
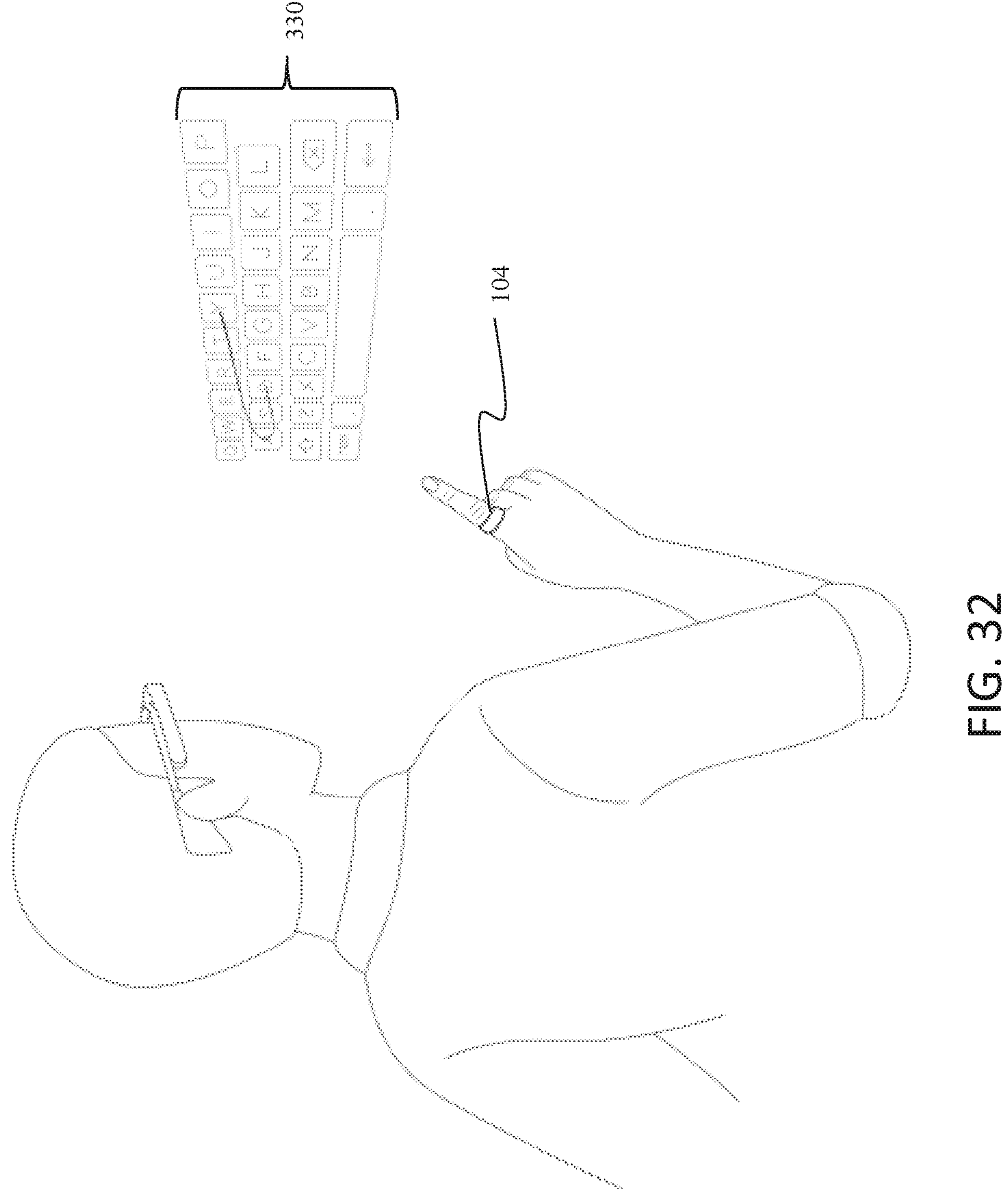
FIG. 32 depicts a user's hands manipulating a virtual 3D model.

By leveraging well-known interactions, the present invention also envisions a universal interface 156 (of FIG. 14, FIG. 16, FIG. 19, FIG. 20, FIG. 21, and FIG. 28). Three primary use cases and several secondary use cases are enabled by the wearable device 104 described herein. In preferred examples, the wearable device 104 is a smart ring configured to be worn on an index finger of the user 102. The primary use cases include: (1) a mouse on any surface use case (of FIG. 14-FIG. 16), (2) a gesture recognition use case (of FIG. 19 and FIG. 24), and (3) a pointer/mouse use case. The secondary use cases include: (4) a pinch gesture (FIG. 28); (5) a measuring technique to measure distance (FIG. 29); a 3D model manipulation technique (FIG. 30); and two smart device input techniques that mimic use of a keyboard (FIG. 31 and FIG. 32). It should be appreciated that smart device 108 may be a computer, a laptop, a virtual reality (VR) headset (of FIG. 22 and FIG. 23), smart glasses (of FIG. 25), or a camcorder (of FIG. 26), among others. The wearable device 104 may also interact with multiple smart devices 108, as shown in FIG. 27.

Figure 14:
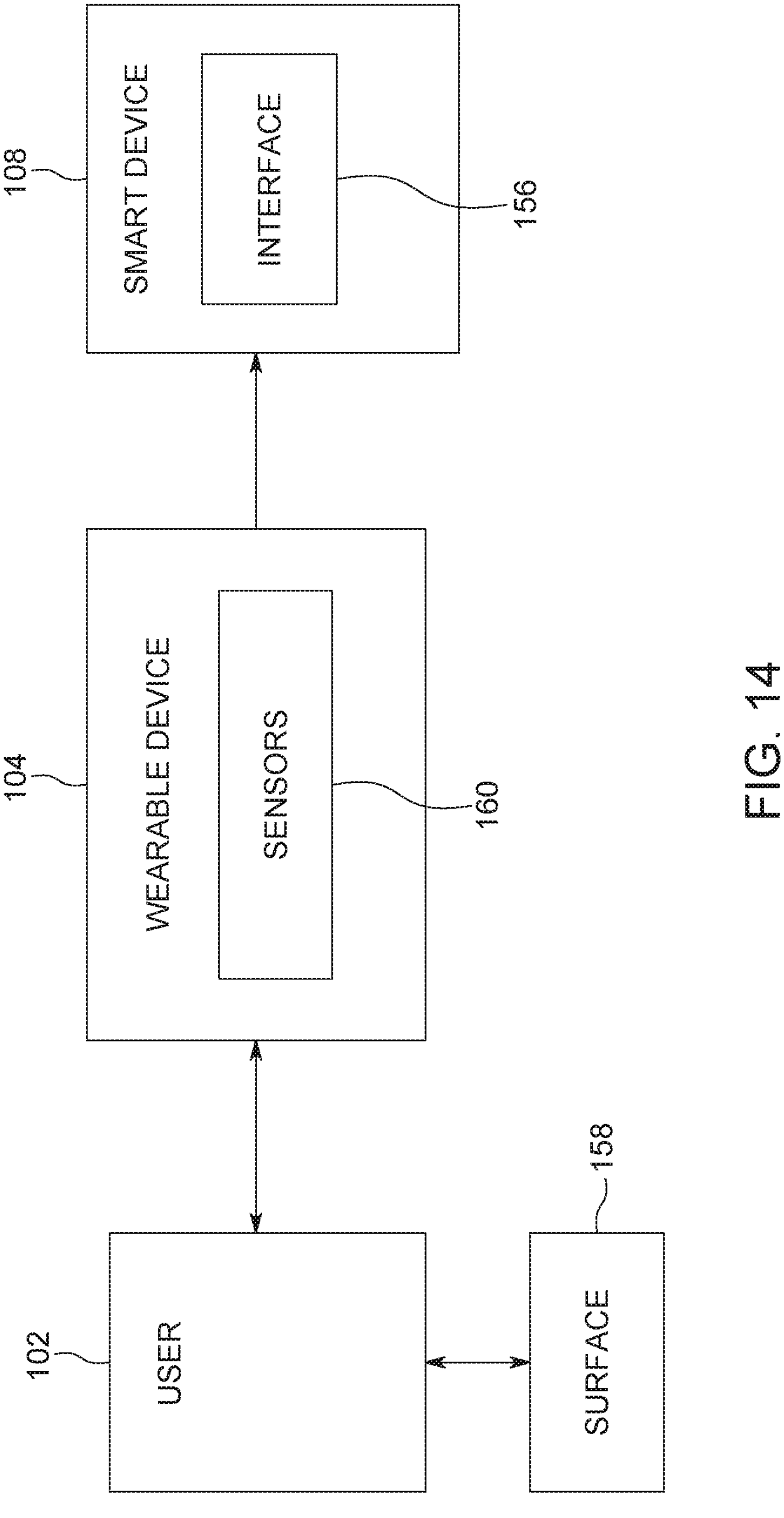
FIG. 14 depicts a block diagram of components of a system associated with a mouse on any surface use case, according to at least some embodiments disclosed herein.
Figure 15:
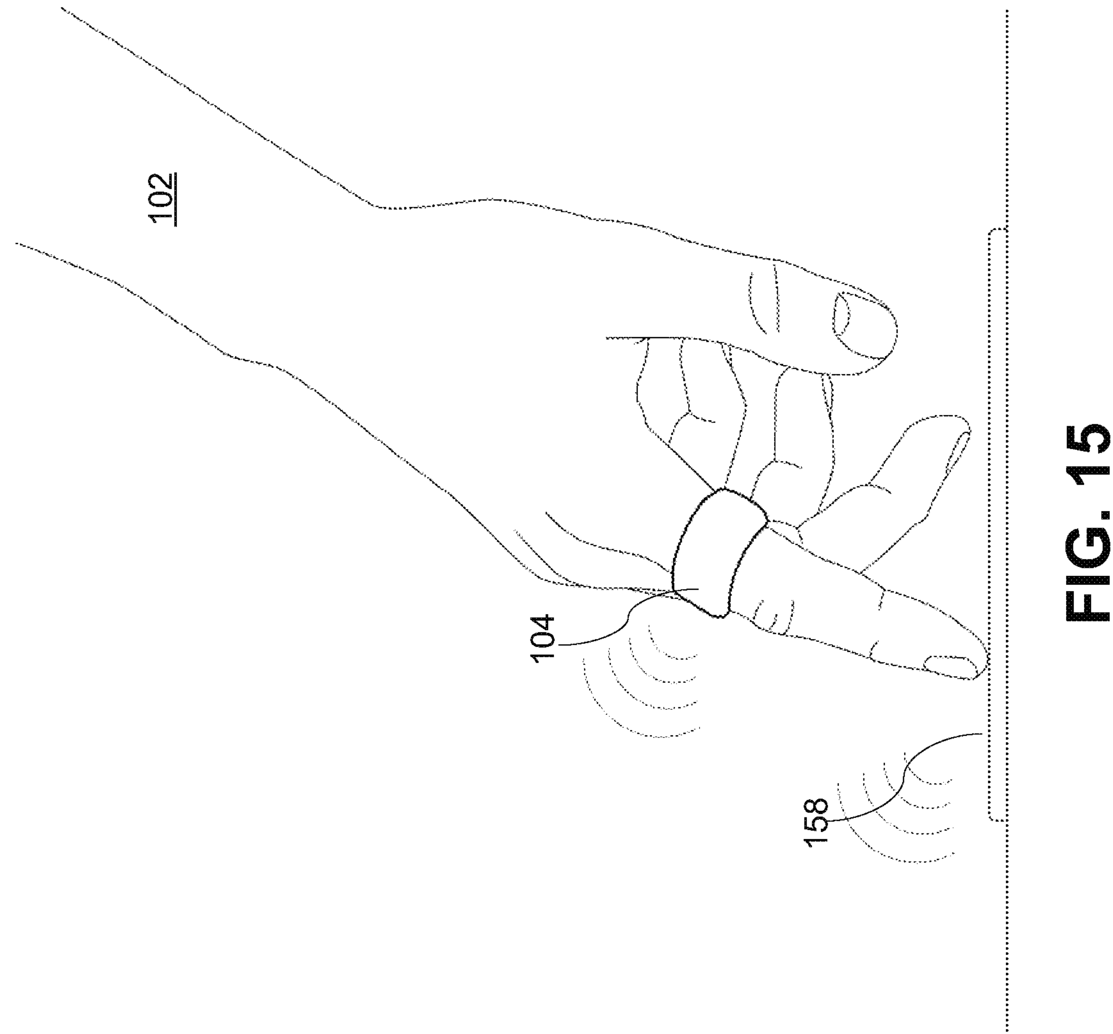
FIG. 15 depicts a schematic diagram of the mouse on any surface use case of FIG. 14, according to at least some embodiments disclosed herein.
Figure 16:
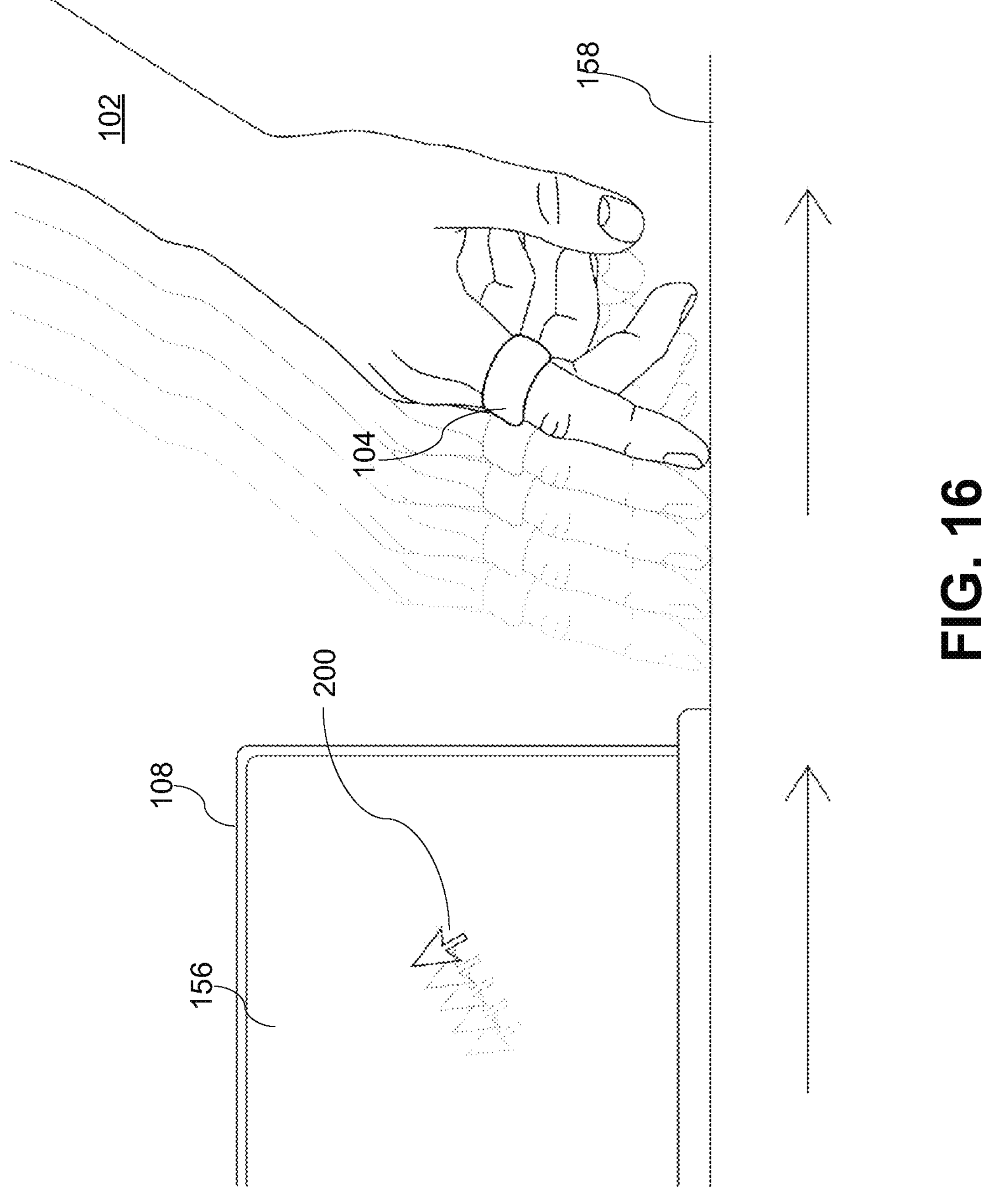
FIG. 16 depicts another schematic diagram of the mouse on any surface use case of FIG. 14, according to at least some embodiments disclosed herein.

In the first use case associated with FIG. 14-FIG. 16, the user 102 wears the wearable device 104 (e.g., the smart ring) on the index finger of the user 102. If the user 102 rubs the index finger on a surface 158 (such as a mousepad), a cursor 200 moves on the universal interface 156 of the smart device 108 (e.g., laptop or similar computing device). For example, as shown in FIG. 16, the user's 102 index finger that's wearing the wearable device 104 (e.g., the smart ring) moves in a left direction on the surface 158 (indicated by the arrows in FIG. 16), which causes the cursor 200 to move in the left direction on the universal interface 156.

In this first use case, the wearable device 104 comprises the one or more sensors 160. In this example, the one or more sensors 160 may comprise one or more magnetic, angular rate, and gravity (MARG) sensors. Each of the MARG sensors contains orthogonally mounted triads of micromachined rate sensors, accelerometers, and magnetometers for a total of nine sensor components. With an integrated microcontroller, the overall form factor is less than one cubic inch and digital data output rate is about 100 Hz. Use of the MARG sensors allows for hands-free and single-handed interactions.

Figure 17:
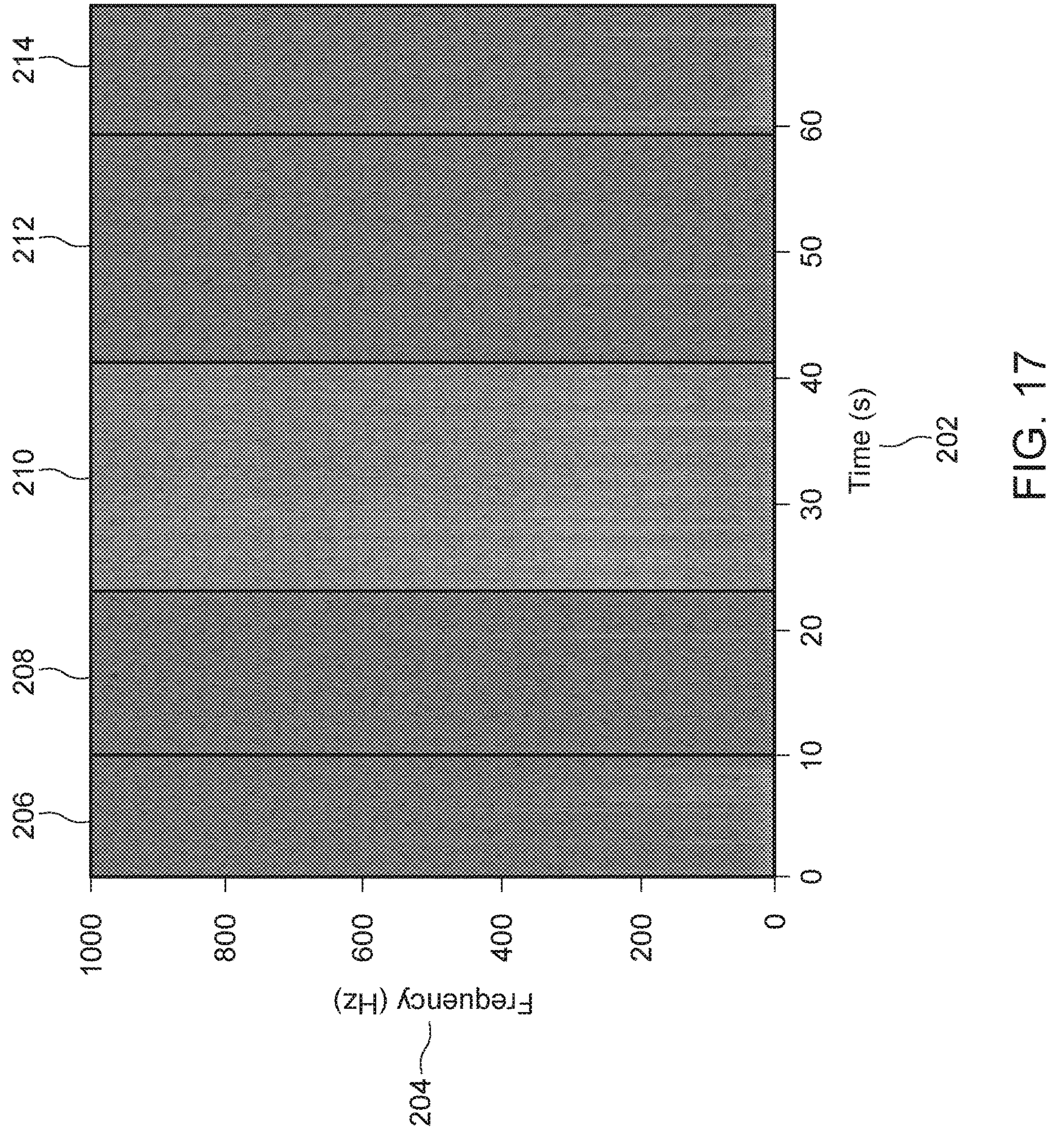
FIG. 17 depicts a graph showcasing frequencies associated with user hand movements in the air as compared to on a surface, according to at least some embodiments disclosed herein.

However, using the MARG sensors to estimate displacement and orientation poses significant technical challenges, such as drift in integrated acceleration due to implicit bias and error terms that accumulate over time. For example, FIG. 17 depicts a graph having an x-axis 202 associated with time in seconds and a y-axis 204 associated with frequency in Hz. Portions 206, 214 are associated with low frequency movements when the user's 102 hand is in the air due to natural shaking of the user's 102 hand and portion 210 is associated with high frequencies when the user's 102 hand is moving on the surface 158 due to friction and surface texture. Further, portions 208, 212 depict a silencing of the frequencies when the user's 102 hand is static on the surface 158 since there is significantly less energy being exerted, with the surface 158 absorbing the natural shaking of the user's 102 hand.

In view of these technical challenges, the instant invention leveraged machine learning to develop a suite of novel tools to overcome these challenges. In order for the wearable device 104 to properly detect whether the user's 102 hand is touching the surface 158, the present invention utilizes a detector. In order to track the user's 102 hand movements on the surface 158 and map those movements to the cursor 200 displacement on the universal interface 156, the present invention utilizes supervised learning, which allows for the collection of movement data on the surface 158 and from the one or more sensors 160 of the wearable device 104 simultaneously.

Figure 18:
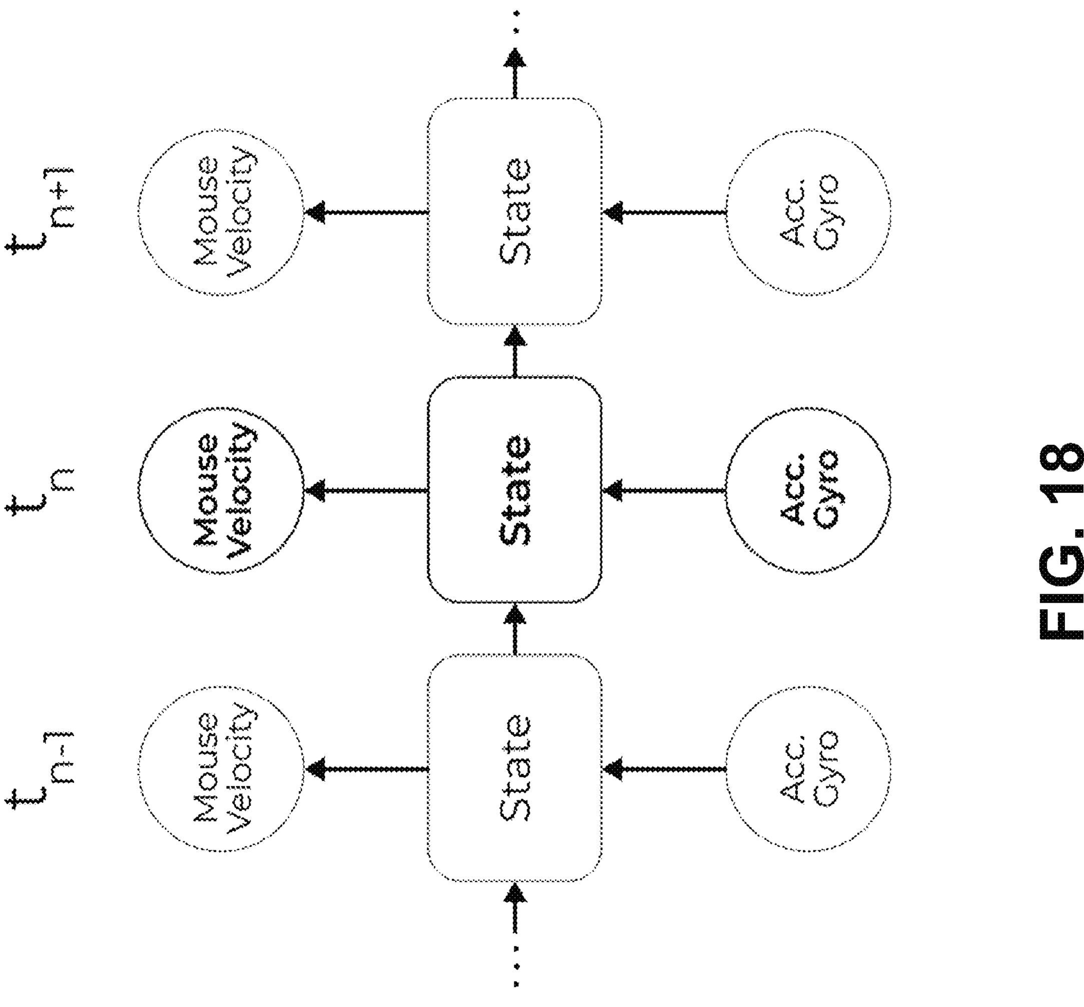
FIG. 18 depicts a schematic diagram associated with recurrent neural networks, according to at least some embodiments disclosed herein.
Figure 19:
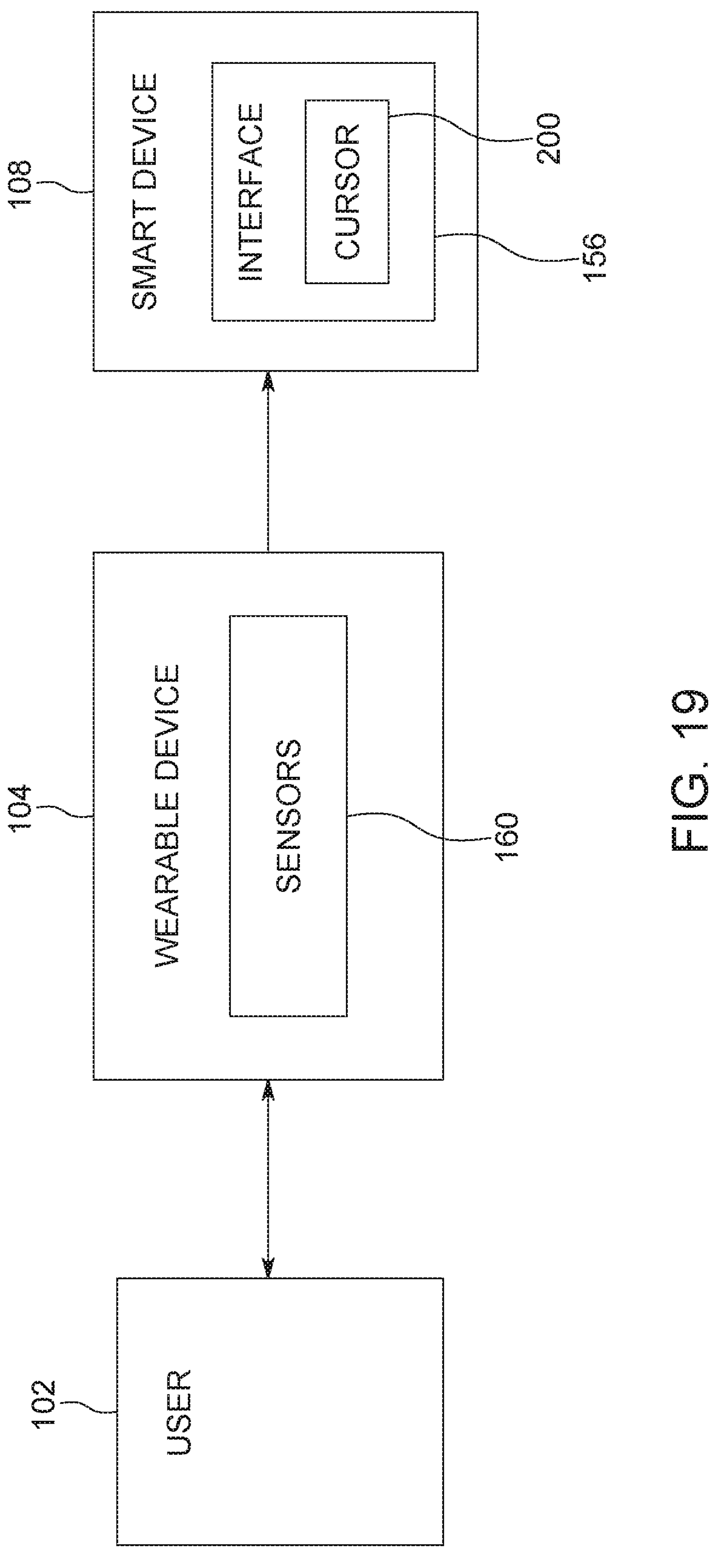
FIG. 19 depicts a block diagram of components of a system associated with a gesture recognition use case, according to at least some embodiments disclosed herein.
Figure 20:
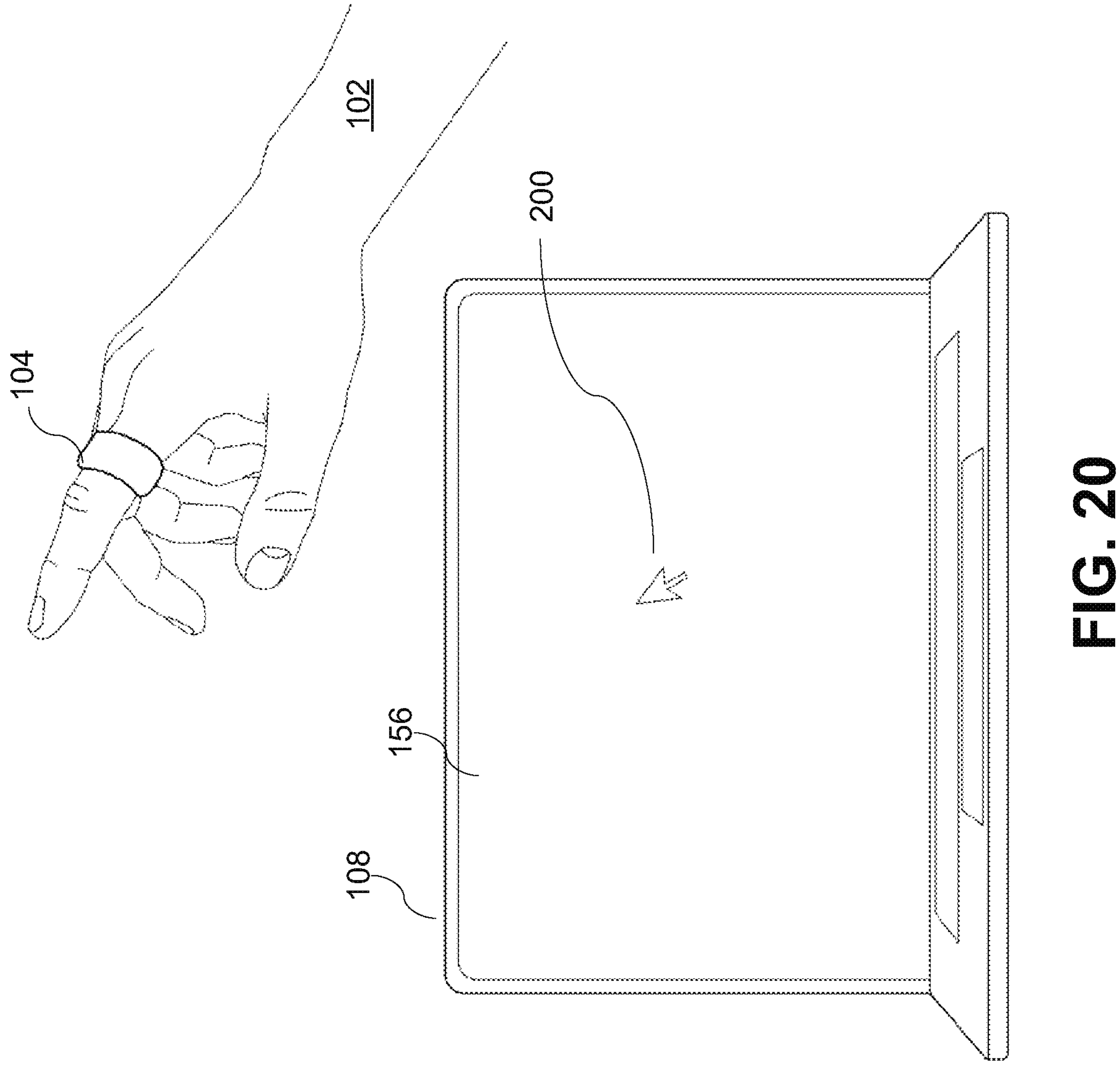
FIG. 20 depicts a schematic diagram of the gesture recognition use case of FIG. 19, according to at least some embodiments disclosed herein.
Figure 21:
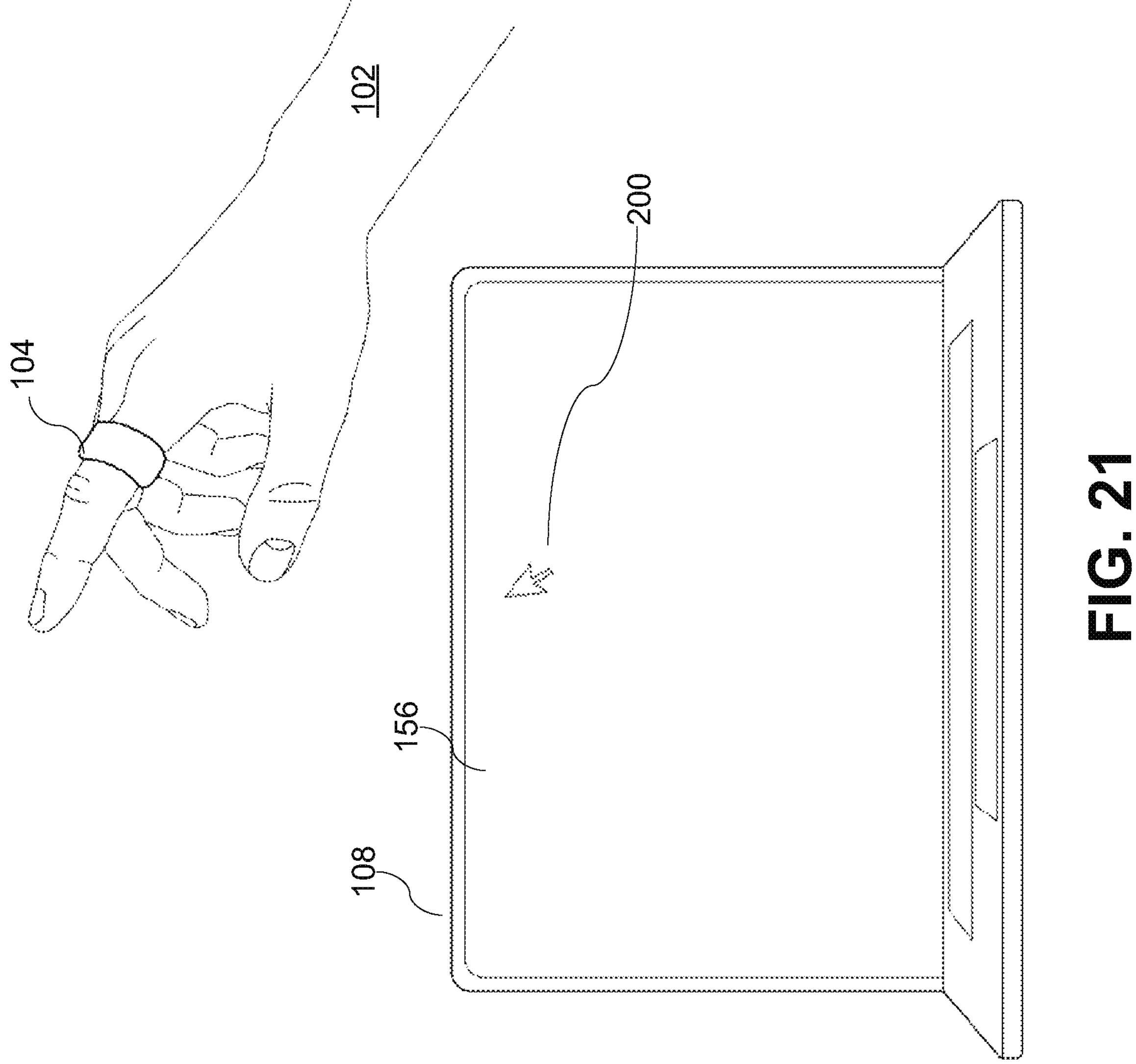
FIG. 21 depicts another schematic diagram of the gesture recognition use case of FIG. 19, according to at least some embodiments disclosed herein.

Specifically, the present invention utilizes recurrent neural networks (of FIG. 18) that, for each input sample, predict mouse velocity. A state vector is updated one sample per iteration. As such, the architecture of this invention is capable of learning dead reckoning, de-noising, and how to integrate the accelerometer (e.g., the accelerometers 174) without lag and oscillations, with low latency real-time inference.

In the second use case (e.g., of FIG. 19), the user 102 wears the wearable device 104 (e.g., the smart ring) on the index finger of the user 102. The user 102 then taps his/her thumb on the wearable device 104 to activate the wearable device 104. As described herein, a "gesture" is a movement of the hand, e.g., left or right swipe, double tap, etc. Gestures are associated with actions, e.g., skip song by swiping left, executable on the universal interface 156. In this second use case, data collection, labeling, training, evaluation and deployment occurs in C++.

Once activated, the user's 102 thumb may engage the wearable device 104 while the user's 102 hand is perpendicular to the universal interface 156. In an illustrative example, a music application (e.g., Spotify®) is executed on the smart device 108. In this example, rotation of his/her hand in a left direction decreases a volume for a given song playing in the music application on the universal interface 156 and rotation of his/her hand in a right direction increases the volume for the given song playing in the music application on the universal interface 156. If the user 102 engages in a swipe gesture, the current song playing in the music application will be skipped. The user 102 can also engage/execute a tap action on the wearable device 102 to pause an action being executed on the universal interface 156.

In another example, a document (e.g., in a PDF format) is open on the universal interface 156. The user 102 may pinch his/her thumb with his/her index finger wearing the wearable device 104 (e.g., the smart ring) on his/her index finger. While holding his/her thumb and index finger together, the user 102 may rotate his/her hand to zoom in or out on the document visible on the universal interface 156. The user 102 may also release his/her thumb from his/her index finger to deactivate the action on the universal interface 156. In the scenario of the music application executed on the smart device 108, rotation of the user's 102 hand in a left direction decreases a volume of the given song on the universal interface 156 and rotation of user's 102 hand in a right direction increases the volume of the given song on the universal interface 156. The user 102 may release his/her thumb from his/her index finger to deactivate the action on the universal interface 156.

The third use case recognizes that laser pointers are often used when presenting. The present invention emulates this functionality in software to use the wearable device 104 (e.g., the smart ring) as a pointer or as a mouse. In this third use case, the user 102 may tap his/her thumb on the wearable device 104 to activate the wearable device 104 (e.g., the smart ring). While holding the wearable device 104 and while the user's 102 hand is perpendicular to the universal interface 156, the user 102 may move his/her hand in an upward direction (of FIG. 20 and FIG. 21), which moves the cursor 200 in the upward direction on the universal interface 156.

If the user 102 double-taps on the wearable device 104, the cursor 200 engages/clicks on a component on the universal interface 156. For example, if website search results are displayed on the universal interface 156 (e.g., from an executed search engine search) and the cursor 200 is hovering over a first search result (e.g., a webpage for a restaurant), if the user 102 double-taps on the wearable device 104, the cursor 200 engages this first search result. The user 102 may then hold his/her thumb on the wearable device 104 and move in a left direction to scroll down on the first search result (e.g., the webpage for the restaurant) executed on the universal interface 156 or in a right direction to scroll up on the first search result (e.g., the webpage for the restaurant) executed on the universal interface 156.

In another example, the present invention leverages a Google handwriting API where a sample drawn out points occurs on a 2D plane, the points are converted to a sequence of cubic Bezier curves. It should be appreciated that a "Bezier curve" is a parametric curve used in computer graphics and related fields. Then, the Google API is queried with a given sequence and displays a top response. Put another way, while the user's 102 thumb engages the wearable device 104, the user 102 may move his/her hand in the air to write letters or words, which are then displayed as text on the universal interface 156 (e.g., the top response by the Google API), once the user 102 disengages his/her thumb from the wearable device 104.

The secondary use cases include: (4) a pinch gesture (FIG. 28); (5) a measuring technique to measure distance (FIG. 29); a 3D model manipulation technique (FIG. 30); and two smart device input techniques that mimic use of a keyboard (FIG. 31 and FIG. 32). The hardware and techniques of the foregoing primary use cases may also be used to realize these secondary use cases.

The pinch gesture 280, illustrated in FIG. 28, is accomplished wearing the smart ring 104 on the index finger, and moving the thumb and index finger together. The pinch gesture may be defined and programmed to have a specialized function, such as identifying a fixed point on a 2D virtual surface or in a 3D virtual volume. Conversely, an opposite gesture may be accomplished by moving the thumb and index finger apart. These gestures may be used to implement scale changing inputs of an image or video being displayed and having the focus on universal interface 156, such as zooming in (by opening the space between the thumb and index finger) or zooming out (by pinching the thumb and index finger together).

Figure 29:
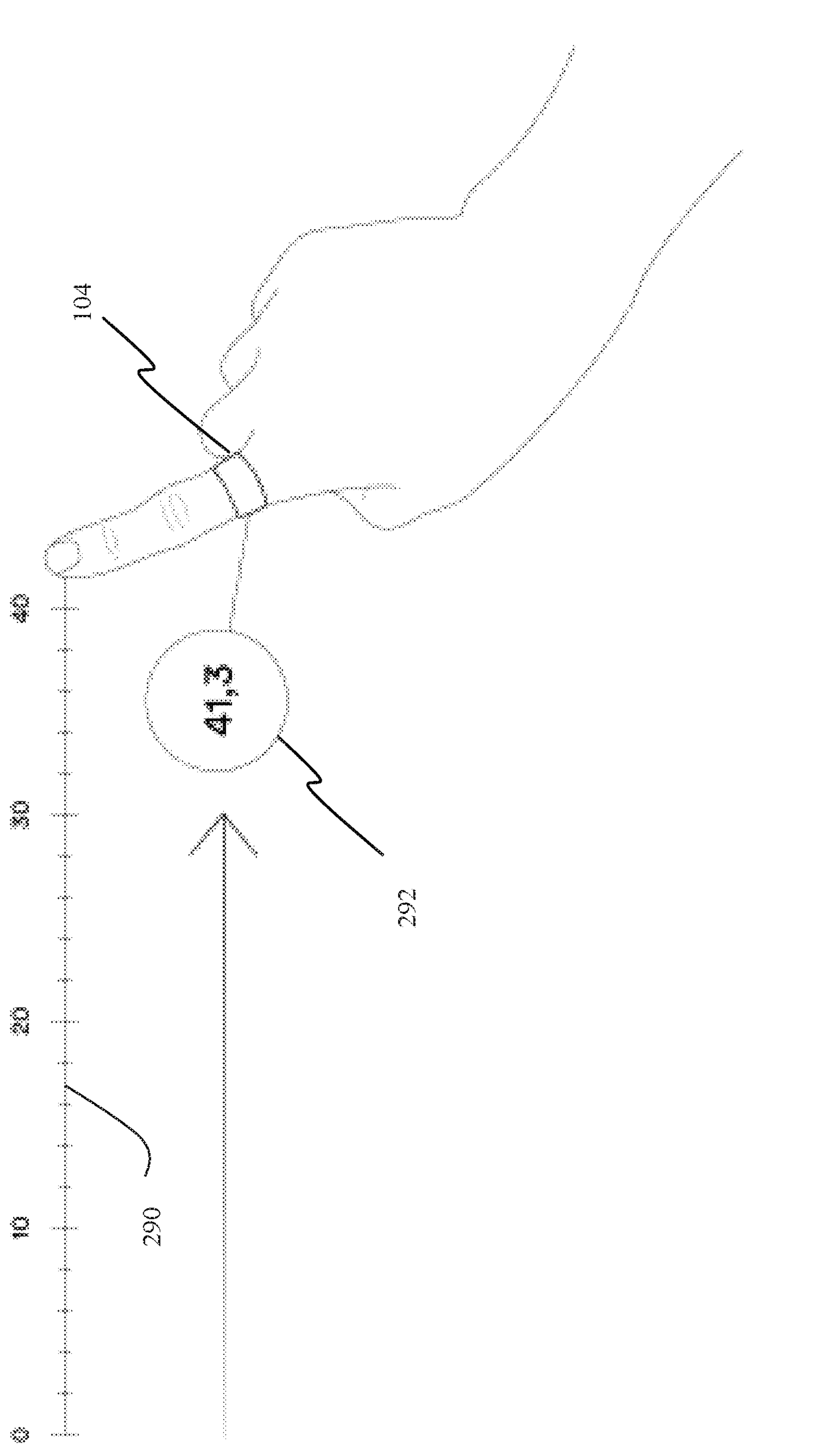
FIG. 29 depicts a user's hand wearing a wearable device associated with recognizing a measuring gesture.

FIG. 29 shows a smart ring 104 that is being used to measure a distance on an image displayed on universal interface 156. The image may be a line segment, or coordinates on a Cartesian graph 290. For example, the user's finger may be used to identify and work with one or more points 292 on a coordinate plane displayed on universal interface 156. Other example use cases may include measuring distances on a geographic map being displayed, or making measurements on a displayed architectural drawing or the like.

Figure 30:
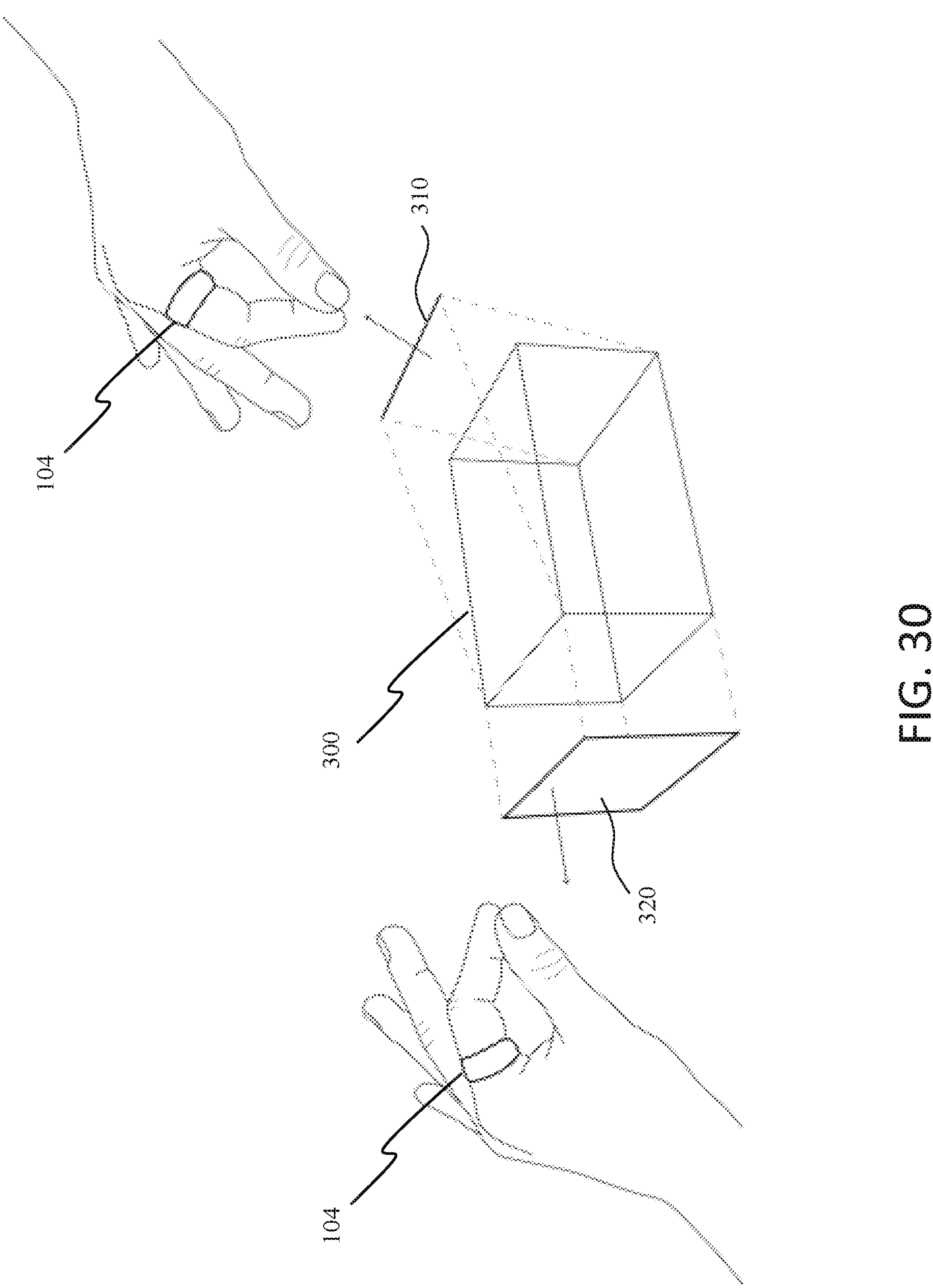
FIG. 30 depicts a user's hands operating a first example virtual keyboard.

FIG. 30 illustrates a use case in which a virtual 3D model 300 displayed on universal interface 156 is manipulated. Here, the relevant gesture(s) may involve the use of two index fingers, both wearing smart rings 104. In an example operation, the positions of both index fingers relative to the displayed 3D model are shown on universal interface 156. Making a pinching gesture initiates a manipulation mode. Thereafter, the position of the index finger of either hand moving through a virtual model space is tracked and displayed on the universal interface 156. Executing a pinching gesture is recognized as grabbing an aspect of the 3D model, such as an edge 310 or a surface 320, to modify a dimension of the 3D model. In FIG. 30, the user's 102 right hand has grabbed an edge 310 of the 3D model 300 and moved it upward and to the right, causing interface 156 to display the portion of the 3D model terminating in that edge to be correspondingly stretched in that same direction. Similarly, the user's 102 left hand has grabbed a surface 320 of the 3D model 300 and moved it to the left, causing interface 156 to display the portion of the 3D model terminating in that surface to be correspondingly stretched in the left direction by the amount the hand is moved.

FIG. 31 illustrates a use case in which a smart ring 104 is worn on the index finger of each of a user's 102 hand, and both hands are used to type on a virtual keyboard 330 displayed on universal interface 156. In this case, the index fingers are placed on "anchor keys" of the keyboard "home row", that is, left and right index fingers on the F and J keys respectively, as shown in FIG. 31. Two modes of typing may be made available, depending on how the keyboard and smart rings are realized. In one mode, the two index fingers may be used to pick letters in sequence, as may be done by a person who is not proficient in so-called touch typing using a physical keyboard. The other mode employs all fingers and thumbs as in conventional touch typing. In a preferred embodiment, the virtual keyboard may be treated as though it is laying on a desktop or the like. The user goes through the motions of touch typing while keeping an eye on the universal interface 156 to be sure the keystrokes are being captured correctly.

FIG. 32 illustrates a use case in which a virtual keyboard is being used to type with one hand. The virtual keyboard 330 is displayed on universal interface 156, and virtual keystrokes are entered as input by moving the user's 102 index finger that is wearing the smart ring 104 to point to a displayed key and make a gesture to tap the key, such as momentarily pointing downward with the index finger. Alternatively, the index finger may be used to draw a path through successive keys in an order that can be interpreted as a sequence of letters appearing in words that can be recognized by a computing processor in or operatively coupled to the smart ring.

Figure 33:
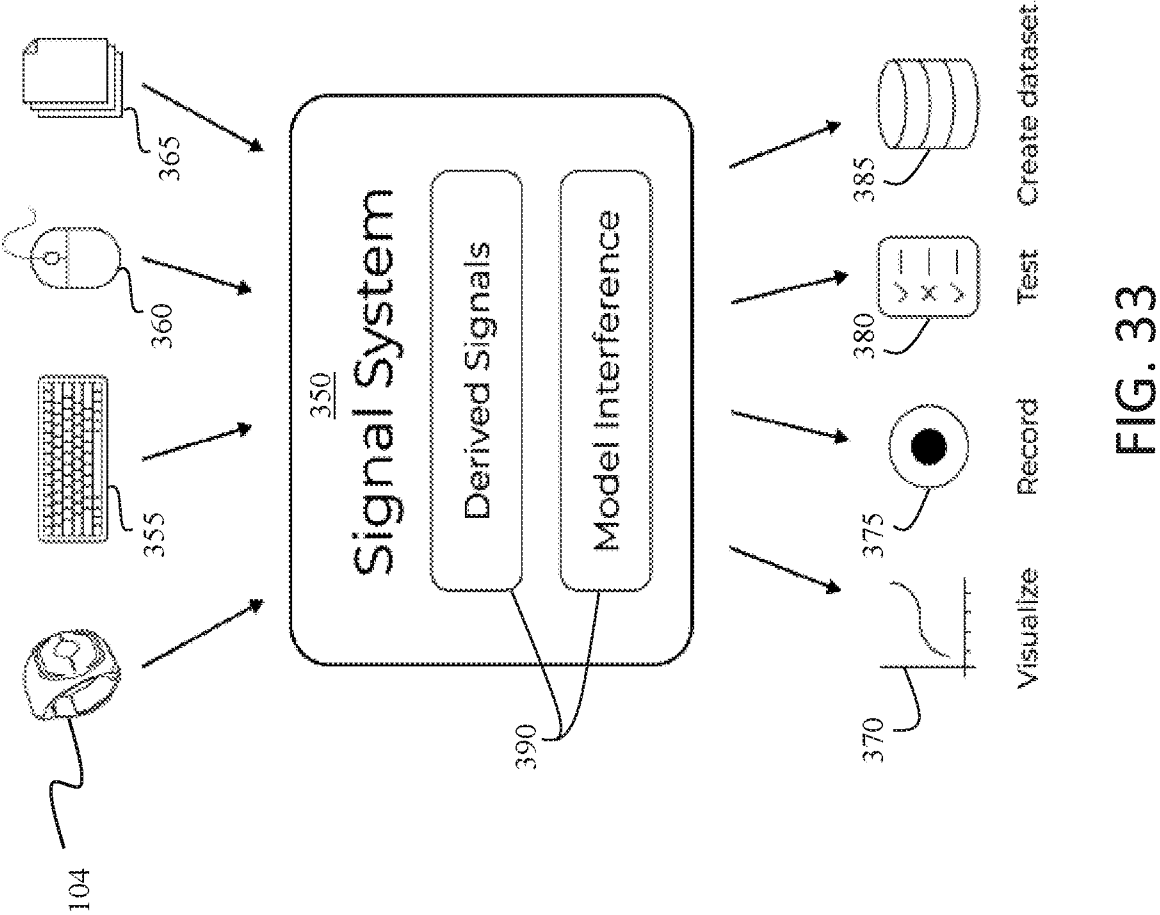
FIG. 33 depicts a schematic diagram showcasing a signal system described herein, according to at least some embodiments disclosed herein.

FIG. 33 depicts a schematic diagram of a signal system 350 that provides the functions and results described in the foregoing according to at least some embodiments disclosed herein. As shown, the signal system 350 may be configured or programmed to provide virtually any signal-related functionality, such as finding a sum or difference of signals, or other mathematical manipulations such as convolution or fast fourier transform (FFT) for example, or signal conversions between analog and digital signal types, and the like. FIG. 33 illustrates two possible signal processing functions 390, although others may be used, in any desired combination, to achieve any desired signal-base output.

As shown, a variety of inputs can be received by the system 350, including input from a smart ring 104 or the like, in addition to one or more conventional signal sources, such as input from a keyboard 355 or mouse 360, or an input file 365, etc. Outputs of the system 350 may include, for example, graphical visualization 370 of data processed by the system, displayed on a universal interface 156. System outputs may additionally or alternatively include one or more recordings 375, testing results 380, or creation of datasets 385.

It should be appreciated that the software architecture for the previously mentioned use cases includes both machine learning and firmware. The architecture is configured to subtract time-varying bias, de-noise, and integrate. Regarding the machine learning, the present invention utilizes a highly customizable Python architecture enabling quick experimentation. The signal system includes input sources (e.g., raw sensor data, touchpad, keyboard, files, etc.). The signal system allows for real-time visualization and allows for both process and replay recorded data in a new way. The signal system includes support for multiple sample rates, e.g., raw signal at high rate, downsample and add processing.

Additionally, the machine learning includes a pipeline for dataset creation, which allows for the training and testing of splits based on metadata, e.g., individuals, touch surfaces and data augmentation. A cloud infrastructure is also included that allows for seamless integration with Google Cloud graphics processing units (GPUs) and includes tools for error analysis. The system further includes a dashboard for experiment monitoring.

The firmware includes a modern C++ cross-platform codebase, bare metal firmware architecture that is optimized for low-latency, reliability, power consumption and quick experimentation, a hardware interconnect that allows for reliable sensor readings, a highly optimized sensor fusion processing on-device, multiple communication protocols (e.g., USB serial, Bluetooth, proprietary wireless, etc.), and a pipeline for porting neural networks from Python to performant C++.

Aspects of the present invention are described herein with reference to block diagrams of methods, systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system comprising:

a smart device comprising a universal interface;

a cursor movable on the universal interface; and a wearable device comprising:

an adjustable strap affixed to a body portion to form an opening, the opening being configured to receive a body part of a user therein;

a gesture component; and at least one sensor configured to:

detect an action by the user on the wearable device to activate the wearable device; and in response to a detection of a gesture action by the user, execute an action on the universal interface, wherein the smart device further comprises a handwriting API configured to:

convert one or more points to a sequence of cubic Bézier curves;

query the sequence of cubic Bezier curves; and identify a match between the sequence of cubic Bézier curves and a predicted match such that the predicted match is displayed as text on the universal interface.

2. The system of claim 1, wherein the action by the user on the wearable device comprises a tap action.

3. The system of claim 1, wherein the wearable device is selected from the group consisting of: a watch, a bracelet, a wristband, an ankle band, a ring, and a necklace.

4. The system of claim 3, wherein the wearable device comprises the ring, and wherein the gesture action comprises a movement of a hand of the user.

5. The system of claim 4, wherein the gesture action is selected from the group consisting of: a rotation action, a left swipe action, a right swipe action, a movement upwards action, and a movement downwards action.

6. The system of claim 1, wherein the action executed on the universal interface is selected from the group consisting of: an increase in a volume, a decrease in the volume, a skip action, a zoom in action, and a zoom out action.

7. The system of claim 1, wherein the at least one sensor is further configured to:

detect another action executed by the user on the wearable device to pause the action executed on the universal interface.

8. The system of claim 1, wherein the at least one sensor is further configured to:

detect another action executed by the user on the wearable device to engage or click on a component on the universal interface.

9. The system of claim 1, wherein the gesture action by the user comprises drawn out points on a two-dimensional plane.

10. The system of claim 1, wherein the wearable device further comprises:

one or more motion detecting sensors configured to assist the gesture component, wherein each of the one or more motion detecting sensors comprises an audio sensor or an accelerometer.

11. The system of claim 1, wherein the wearable device further comprises:

at least one pressure sensor configured to assist the gesture component, wherein the at least one pressure sensor comprises an array of pressure sensors radially distributed around an interior surface of the body portion.

12. The system of claim 11, wherein each of the at least one pressure sensor comprises a force sensitive resistor or a piezoelectric sensor.

13. The system of claim 1, wherein the wearable device is a ring, and wherein the body part of the user is an index finger of the user.

14. A system comprising:

a smart device comprising a universal interface;

a cursor movable on the universal interface; and a wearable device comprising:

an adjustable strap affixed to a body portion to form an opening, the opening being configured to receive a body part of a user therein;

a gesture component; and at least one sensor configured to:

detect an action by the user on the wearable device to activate the wearable device; and in response to a detection of a gesture action by the user, execute an action on the universal interface, wherein the wearable device further comprises:

at least one pressure sensor configured to assist the gesture component, wherein the at least one pressure sensor comprises an array of pressure sensors radially distributed around an interior surface of the body portion.

15. The system of claim 14, wherein each of the at least one pressure sensor comprises a force sensitive resistor or a piezoelectric sensor.

* * * * *